US008639646B1

(12) United States Patent
Presgraves et al.

(10) Patent No.: US 8,639,646 B1
(45) Date of Patent: Jan. 28, 2014

(54) SYSTEM TO BUILD, ANALYZE AND MANAGE A COMPUTER GENERATED RISK ASSESSMENT MODEL AND PERFORM LAYER OF PROTECTION ANALYSIS USING A REAL WORLD MODEL IN SOFTWARE OF A SAFETY INSTRUMENTED SYSTEM ARCHITECTURE

(71) Applicant: Applied Engineering Solutions, Inc., Greenville, SC (US)

(72) Inventors: Carolyn Crosby Presgraves, Anderson, TX (US); Cody O'Neal Wyndham Gentry, Greenville, SC (US); Eric Christopher Van Beek, Simpsonville, SC (US); Dane Ryan Brady, Anchorage, AK (US); Taylor William Schuler, Greenville, SC (US); William Davis Creel, Greer, SC (US); Michael Dennis Scott, Anchorage, AK (US)

(73) Assignee: Applied Engineering Solutions, Inc., Greenville, SC (US)

( * ) Notice: Subject to any disclaimer, the term of this patent is extended or adjusted under 35 U.S.C. 154(b) by 0 days.

(21) Appl. No.: 13/966,234

(22) Filed: Aug. 13, 2013

Related U.S. Application Data

(63) Continuation-in-part of application No. 13/251,051, filed on Sep. 30, 2011, now Pat. No. 8,521,676.

(60) Provisional application No. 61/388,423, filed on Sep. 30, 2010, provisional application No. 61/388,437, filed on Sep. 30, 2010.

(51) Int. Cl.
*G06F 17/00* (2006.01)
*G06N 5/02* (2006.01)

(52) U.S. Cl.
USPC .................................. 706/46; 700/21

(58) Field of Classification Search
USPC ............................. 706/46; 700/21, 79
See application file for complete search history.

(56) References Cited

U.S. PATENT DOCUMENTS

| 7,813,820 | B2 | 10/2010 | Opem et al. |
|---|---|---|---|
| 2005/0027379 | A1 | 2/2005 | Dyk et al. |
| 2006/0020604 | A1* | 1/2006 | Murez et al. ............ 707/100 |
| 2008/0126150 | A1* | 5/2008 | Kaufman et al. ............ 705/7 |
| 2009/0012631 | A1 | 1/2009 | Fuller |
| 2010/0004761 | A1 | 1/2010 | Flanders et al. |
| 2012/0101953 | A1 | 4/2012 | James et al. |

OTHER PUBLICATIONS

Timms, C. et al. "Software Tools for the Lifecycle Suport of Safety Instrumented Systems". TUV International Symposium 2006. pp. 1-14, 2006.
Fonseca, J.A. et al. "CMMI RAMS Extension Based on CENELEC Railway Standard". SAFECOMP 2005, LNCS 3688, pp. 1-12, 2005.

* cited by examiner

*Primary Examiner* — Jeffrey A Gaffin
*Assistant Examiner* — Benjamin Buss
(74) *Attorney, Agent, or Firm* — Buskop Law Group, PC; Wendy Buskop

(57) ABSTRACT

A system to build, manage, and analyze a computer generated risk assessment model and perform a layer of protection analysis. The system uses a computer generated safety instrumented system model for managing a process safety lifecycle for a safety instrumented system in a facility. The computer generated safety instrumented system model has at least one instrumented protective function.

55 Claims, 28 Drawing Sheets

FIGURE 1A

COMPONENT LIBRARY 316

| COMPONENT_ID | TAGNAME | COMPONENT TYPE | EQUIPMENT TYPE | NAME | PROCESS DESCRIPTION | ASSET ID | RECONCILING ID |
|---|---|---|---|---|---|---|---|
| 1 | PT-120 | INPUT | PRESSURE TRANSMITTER | PT-120 | SEPARATOR 1 PRESSURE | 1111331 | 778b392 |
| 2 | PS-120 | INPUT | PRESSURE SWITCH | PS-120 | SEPARATOR 1 PRESSURE | 1111332 | 779c461 |
| 3 | PT-122 | INPUT | PRESSURE TRANSMITTER | PT-122 | SEPARATOR 2 PRESSURE | 1111445 | 778b393 |
| 4 | PS-122 | INPUT | PRESSURE SWITCH | PS-122 | SEPARATOR 2 PRESSURE | 1111446 | 779d743 |
| 5 | SIS-100 | LOGIC SOLVER | INDUSTRIAL PLC | SIS-100 | SEPARATOR CONTROL | 1111447 | 780b456 |
| 6 | SDY-120 | OUTPUT | 3 WAY SOLENOID | SDY-120 | SEPARATOR 1 OUTLET VALVE | 1111551 | 785c357 |
| 7 | SDV-120 | OUTPUT | BALL VALVE | SDV-120 | SEPARATOR 1 OUTLET VALVE | 1111552 | 786b393 |
| 8 | SDY-122 | OUTPUT | 3 WAY SOLENOID | SDY-122 | SEPARATOR 2 OUTLET VALVE | 1111771 | 785d358 |
| 9 | SDV-122 | OUTPUT | BALL VALVE | SDV-122 | SEPARATOR 2 OUTLET VALVE | 1111772 | 786d394 |

FIGURE 1B

ASSEMBLY LIBRARY 308

| ASSEMBLY_ID | NAME | ASSEMBLY TYPE | PROCESS DESCRIPTION | LOCATION | CALCULATED PFD | OVERRIDE | OVERRIDE DOCUMENT ID | OVERT FAULT STATUS |
|---|---|---|---|---|---|---|---|---|
| 10 | PS-120 | INPUT | SEPARATOR 1 PRESSURE | 10 | .0001 | FALSE | 113 | ZERO |
| 20 | PS-122 | INPUT | SEPARATOR 2 PRESSURE | 10 | .001 | FALSE | 114 | ZERO |
| 30 | SDV-120 | OUTPUT | SEPARATOR 1 OUTLET VALVE | 10 | .0001 | FALSE | 115 | CLOSED |
| 40 | SDV-122 | OUTPUT | SEPARATOR 2 OUTLET VALVE | 10 | .001 | FALSE | 117 | CLOSED |

FIGURE 1C

LOGIC SOLVER LIBRARY 309

| LOGIC SOLVER_ID | LOGIC SOLVER LOCATION | NAME | DESCRIPTION | PFD | TESTING INTERVAL |
|---|---|---|---|---|---|
| 1151 | 10 | CPL-1132 | COMPRESSOR 1 CONTROL PANEL | .000001 | 36 |
| 1152 | 10 | CPL-113 | COMPRESSOR 2 CONTROL PANEL | .000001 | 36 |
| 101 | 10 | SIS-17 | SEPARATOR 1 SAFETY PANEL | .000001 | 12 |
| 102 | 10 | SIS-18 | SEPARATOR 2 SAFETY PANEL | .000001 | 12 |

FIGURE 1D

ASSEMBLY - COMPONENT RELATIONSHIP TABLE 300

| ASSEMBLY_ID | COMPONENT_ID | PURPOSE | LOGIC SOLVER |
|---|---|---|---|
| 10 | 1 | SENSOR | NULL |
| 10 | 2 | INTERFACE | 101 |
| 20 | 3 | SENSOR | NULL |
| 20 | 4 | INTERFACE | 102 |
| 30 | 6 | INTERFACE | 101 |
| 30 | 7 | FINAL ELEMENT | NULL |
| 40 | 8 | INTERFACE | |
| 40 | 9 | FINAL ELEMENT | |

FIGURE 2A

ASSEMBLY GROUP LIBRARY 342

| ASSEMBLY GROUP_ID 344 | NAME 346 | VOTING INSTRUCTION 348 | TEST INTERVAL 349 | CALCULATED ASSEMBLY GROUP FAILURE 351 | DOCUMENT ID 331 | GROUP TYPE 360 |
|---|---|---|---|---|---|---|
| 100 | TEST SEPARATOR PRESSURE | 2oo2 | 12 | .0001 | 114 | INPUT |
| 200 | TEST SEPARATOR INLET | 1oo2 | 12 | .001 | 115 | OUTPUT |

FIGURE 2B

ASSEMBLY GROUP - ASSEMBLY RELATIONSHIP TABLE 332

| ASSEMBLY GROUP_ID 344 | ASSEMBLY_ID 302 | ASSEMBLY PARAMETER_ID 352 | ASSEMBLY PARAMETER VALUE 356 | PARAMETER UNIT 358 |
|---|---|---|---|---|
| 100 | 10 | 11 | 150 | PSIG |
| 100 | 20 | 12 | 150 | PSIG |
| 200 | 30 | 13 | DEN | |
| 200 | 40 | 14 | DEN | |

FIGURE 3A

INSTRUMENTED PROTECTIVE FUNCTION (IPF) LIBRARY 372

| INSTRUMENTED PROTECTIVE FUNCTION LAYER IDENTIFIER 374 | INSTRUMENTED PROTECTIVE FUNCTION (IPF) NAME 376 | INPUT GROUP VOTING 378 | OUTPUT GROUP VOTING 380 | DOCUMENT IDENTIFIER | CALCULATED INSTRUMENTED PROTECTIVE FUNCTION PROBABILITY OF FAILURE 381 | ACTUATOR TO PERMIT OVERRIDE 383 | SAFEGUARD IDENTIFIER 385 |
|---|---|---|---|---|---|---|---|
| 1000 | TEST SEPARATOR HIGH PRESSURE INTERLOCK | 1oo1 | 1oo1 | 113 | .0048 | FALSE | 1 |
| 1010 | TEST SEPARATOR HIGH LEVEL INTERLOCK | 1oo2 | 1oo2 | 114 | .00067 | FALSE | 2 |
| 1020 | GLYCOL HEATER HIGH TEMP SHUTDOWN | 1oo2 | 1oo2 | 115 | .0035 | FALSE | 3 |
| 1030 | GLYCOL HEATER LOSS OF FLAME INTERLOCK | 1oo4 | 1oo2 | 117 | .0008 | TRUE | 4 |

FIGURE 3B

INSTRUMENTED PROTECTIVE FUNCTION (IPF) - ASSEMBLY GROUP RELATIONSHIP TABLE 362

| INSTRUMENTED PROTECTIVE FUNCTION LAYER IDENTIFIER 374 | ASSEMBLY GROUP IDENTIFIER 344 | INSTRUMENTED PROTECTIVE FUNCTION - ASSEMBLY GROUP RELATIONSHIP IDENTIFIER 375 | ADDITIONAL ACTION 386 |
|---|---|---|---|
| 1000 | 100 | 10001 | FALSE |
| 1000 | 200 | 10001 | FALSE |
| 1010 | 500 | 10001 | TRUE |
| 1010 | 510 | 10002 | TRUE |
| 1010 | 520 | 10003 | FALSE |
| 1010 | 530 | 10004 | TRUE |
| 1020 | 550 | 10004 | TRUE |
| 1020 | 551 | 10004 | FALSE |
| 1020 | 552 | 10005 | FALSE |

FIGURE 3C

DOCUMENT LIBRARY 299

| DOCUMENT_ID 331 | DOCUMENT TYPE 353 | DOCUMENT NAME 355 | DOCUMENT DESCRIPTION 357 |
|---|---|---|---|
| 114 | CAUSE AND EFFECT | SEPARATOR 1 CAUSE AND EFFECT | INLET SEPARATOR 1 CAUSE AND EFFECT |
| 115 | CAUSE AND EFFECT | SEPARATOR 2 CAUSE AND EFFECT | INLET SEPARATOR 2 CAUSE AND EFFECT |
| 116 | CAUSE AND EFFECT | COMPRESSOR 1 CAUSE AND EFFECT | COMPRESSOR 1 CAUSE AND EFFECT |
| 117 | CAUSE AND EFFECT | COMPRESSOR 2 CAUSE AND EFFECT | COMPRESSOR 2 CAUSE AND EFFECT |

FIGURE 3D

LIBRARY OF PUBLICATIONS 301

| STATUTES 290 | INDUSTRY STANDARDS 291 | NATIONAL REGULATIONS 292 | BUSINESS OWNER SPECIFIC POLICIES 293 |
|---|---|---|---|
| 35 USC 101 | IEC - 69205 | 37 CFR 25.1 | DO NOT USE HITACHI VALUES |

FIGURE 3E

STUDY TYPE TABLE 651

| STUDY TYPE NAME 657 | STUDY TYPE IDENTIFIER 658 | STUDY TYPE DESCRIPTION 659 |
|---|---|---|
| HAZOP | 10 | ANALYSIS BASED ON WHAT COULD GO WRONG |
| WHAT IF | 20 | ANALYSIS BASED ON WHAT COULD GO WRONG |

FIGURE 3F

METHODOLOGY TYPE TABLE 670

| METHODOLOGY TYPE NAME 671 | METHODOLOGY TYPE IDENTIFIER 672 | METHODOLOGY TYPE DESCRIPTION 673 |
|---|---|---|
| CAUSE - BASED | 10 | ANALYSIS BASED ON ID ONE CAUSE AND MULTIPLE CONSEQUENCES |
| CONSEQUENCE - BASED | 20 | ANALYSIS BASED ON ID ONE CAUSE AND MULTIPLE CONSEQUENCES |

FIGURE 3G

STUDY LIBRARY 660

| STUDY NAME 661 | STUDY DESCRIPTION 662 | STUDY TYPE IDENTIFIER 658 | USER LOCATION 663 | STUDY IDENTIFIER 664 | METHOD TYPE IDENTIFIER 672 |
|---|---|---|---|---|---|
| GV IP COMPRESSOR | 5-DAY HAZOP | 30 | 101 | 10 | 10 |
| HT IC4 COLUMN | 5-DAY HAZOP | 40 | 236 | 20 | 20 |

FIGURE 3H

NODE LIBRARY 665

| NODE DESCRIPTION 666 | NODE BOUNDARIES 667 | PROCESS LOCATION 668 | DESIGN CONDITION 669 | OPERATING CONDITION 701 | NODE NUMBER 703 | NODE IDENTIFIER 705 |
|---|---|---|---|---|---|---|
| HEAT EXCHANGERS | PIPING/VESSEL | COMP STATION | 5,000 PSIG AT 200° F | 2,000 PSIG | 300 | 1 |
| ROTATING EQUIP | MOTOR | COLUMN BASE | | AT 100° F | 400 | 2 |

FIGURE 3I

SESSION LIBRARY 706

| SESSION NAME 707 | SESSION DATE 709 | SESSION DURATION 711 | STUDY IDENTIFIER 664 | SESSION IDENTIFIER 674 |
|---|---|---|---|---|
| SESSION 1 | 30 JUNE 2013 | 72 HOURS | 10 | 10 |
| SESSION 2 | 12 JULY 2013 | 64 HOURS | 20 | 20 |

FIGURE 3J

SESSION-NODE RELATIONSHIP TABLE 713

| SESSION IDENTIFIER 674 | NODE IDENTIFIER 705 |
|---|---|
| SESSION 1 | 1 |
| SESSION 2 | 2 |

FIGURE 3K

DEVIATION LIBRARY 729

| DEVIATION NAME 733 | DEVIATION DESCRIPTION 735 | PHA-XREF SUFFIX 739 | DEVIATION IDENTIFIER 675 |
|---|---|---|---|
| HI PRESSURE | MORE DETAIL | 1000 | 10 |
| LO PRESSURE | MORE DETAIL | 2000 | 20 |

FIGURE 3L

SCENARIO LIBRARY 743

| SCENARIO IDENTIFIER 745 | DEVIATION IDENTIFIER 741 | NODE IDENTIFIER 705 | NODE NUMBER 703 | PHA-XREF SUFFIX 739 |
|---|---|---|---|---|
| 1 | 2 | 1 | 300 | 1000 |
| 2 | 4 | 1 | 400 | 2000 |

FIGURE 3M

CONSEQUENCE LIBRARY 747

| CONSEQUENCE NAME 748 | CONSEQUENCE IDENTIFIER 749 | CONSEQUENCE DESCRIPTION 751 | LOPA CRITERIA 752 | SAFETY INFORMATION 753 | ENVIRONMENTAL INFORMATION 754 | COMMERCIAL INFORMATION 755 |
|---|---|---|---|---|---|---|
| PRESSURE UP | 1 | GAS RELEASE | YES | 100 | 10 | 1 |
| OPERATOR ERROR | 2 | OVERFILL TANK | YES | 180 | 50 | 1000 |

FIGURE 3N

SAFEGUARD LIBRARY 758

| SAFEGUARD NAME 764 | SAFEGUARD DESCRIPTION 765 | INDEPENDENT PROTECTION LAYER BASIS (IPL) 766 | SAFEGUARD IDENTIFIER 767 | IPL TYPE 768 | PROBABILITY OF FAILURE ON DEMAND (PFD) VALUE 769 | INSTRUMENTED PROTECTIVE FUNCTION LAYER IDENTIFIER |
|---|---|---|---|---|---|---|
| IPL-101-100 | ALARM WITH RESPONSE | A30 | 1 | IPL | .001 | 1010 |
| IPL-102-198 | SIF WITH 2 RATING | IPF | 2 | IPF | .011 | 1000 |

FIGURE 3O

CAUSE LIBRARY 771

| CAUSE NAME 773 | CAUSE IDENTIFIER 772 | CAUSE DESCRIPTION 775 | CAUSE TYPE 774 | CAUSE FREQUENCY 776 | CAUSE REMARK 777 |
|---|---|---|---|---|---|
| OPERATOR FAILURE | 1000 | HUMAN | OPERATOR | .1 | NEED SIZING BASIS |

FIGURE 3P

SCENARIO-CONSEQUENCE RELATIONSHIP TABLE 778

| SCENARIO ID 745 | CONSEQUENCE ID 749 |
|---|---|
| 1 | 2 |

FIGURE 3Q

SCENARIO-CAUSE RELATIONSHIP TABLE 779

| SCENARIO ID 745 | CAUSE IDENTIFIER 772 |
|---|---|
| 1 | 1000 |

FIGURE 3R

CAUSE-CONSEQUENCE TABLE 676

| CAUSE IDENTIFIER 772 | CONSEQUENCE IDENTIFIER 749 | CAUSE-CONSEQUENCE IDENTIFIER 677 |
|---|---|---|
| 1000 | 1 | 10 |
| 2000 | 2 | 20 |

FIGURE 3S

CAUSE-CONSEQUENCE-SAFEGUARDS RELATIONSHIP TABLE 790

| CAUSE-CONSEQUENCE IDENTIFIER 677 | SAFEGUARD IDENTIFIER 767 |
|---|---|
| 10 | 1 |

| (logo) | | Assembly Test Plan for LS-182 | |
|---|---|---|---|
| | | ⌐721 | ⌐724 |

720 —

| Facility | | Assembly Name | Test Plan Name |
|---|---|---|---|
| AE Solutions-Safety Lifecycle Management-North America-AK-Anchorage Facility1(Anchorage Office Facility1) | | LS-182 | Procedure_High Level Non Bridle Tank Level |
| Module | | | |
| Anchorage Facility1 | | | |

726 —

Process Description

Test Separator High Level

728 —

| Test Plan Status | Approved By | Approval Date | Comp Tag Name | Comp Name | Fail Mode |
|---|---|---|---|---|---|
| ASBUILT | None | 7/4/2010 12:00 AM | LS-182 | LS-182 | |

730 —

Work Requirements

| Required Permits | Policy & Specifications | Personnel | Tools & Instruments |
|---|---|---|---|
| Defeated Safety Device Log | Safety Handbook | Control Room Op | Field Radios |
| | Failure Classification Specification | I&T | Test Pressure Gauge |
| | | | Process Pressure Gauges (2) |

731

732 —

Drawings and Documents for Reference

| DRAWINGS | | DOCUMENTS | |
|---|---|---|---|
| Drawing Type | Drawing No | Document Type | Document No |
| P&ID | MI-0005-001 | C&E | CE_GEN1_54 |
| MI-0005-001 | | Module 71 | |

734 —

Assembly Parameters/Threshold Limits

| Parameter Type | Value | Lower Limit | Upper Limit | Units | Approach | Logic Action | As Found |
|---|---|---|---|---|---|---|---|
| LSHH | 48 | 45 | 51 | IN | Inc | | |
| Type Effect | Type Alarm | Alarm Name | | Alarm Tag | | Alarm Point | As Left |
| Trip | | | | | | | |

736 —

Comments about assembly LS-182:

Test Separator High Level

738 —

Test Results

If the device passes the test, place a check in the box under PASS below. If the device fails the test, place a check in the box under FAIL SAFE or FAIL DANGEROUS below, and record the classification code for the failure in Fail Code box. See the Failure Classification Specification document in the Policies and Specifications of the Test Requirements section above for the defined fail codes.

| Parameter Type | PASS | FAIL SAFE | FAIL DANGEROUS | FAIL CODE | Field Notes: |
|---|---|---|---|---|---|

| | | | | | |
|---|---|---|---|---|---|
| LSHH | ☐ | ☐ | ☐ | | |
| ALARM | | | | | |
| | ☐ | ☐ | ☐ | | |

740

| TEST PERSONNEL SIGN-OFF ||| TEST PROCEDURE APPROVAL |||
|---|---|---|---|---|---|
| DEPARTMENT | TEST PERSON | TEST DATE | DEPARTMENT | VERIFING PERSON | VERIFY DATE |
| I&T | I&T | mm/dd/yyyy | Operations | Control Room Op | mm/dd/yyyy |
| | | | | | |

Detail Information and Steps to Execute

*700  702  704  715                                              708*

| Task | Step | Staff | √ | Work Method Steps |
|---|---|---|---|---|
| | | | | Procedure_High Level Non Bridle Tank Level - Work Methods for Testing: LS-182 |
| 1 | | | | PRE-TEST - |
| | 1 | | ☐ | Obtain the appropriate permits for the testing and provide the proper notifications to operating personnel regarding the testing, any special requirements, and subsequent alarms that may be generated. |
| | 2 | | ☐ | Verify that any special safety procedures associated with testing or the actions required during testing have been identified and are being followed. |
| | 3 | | ☐ | Verify any required personal protection equipment (PPE) required for the testing is available and in good condition. |
| 3 | | | | TEST - |
| | 1 | | ☐ | Coordinate and communicate with operations to install the bypasses (software, hardware switches, jumpers, etc.) listed in the Trip Prevention Details in the document section if required in order to prevent process upset upon trip. |
| | 2 | | ☐ | Record the method used to verify the state change below. (IT) Verification Method: LS-182 |

710, 712, 718, 750, 714, 716

*742                                          744*

| Tester Comments - Additional Steps | Observed Deficiencies and Corrective Actions |
|---|---|
| | |
| | |
| | |

FACILITY ASSET/MAINTENANCE MANAGEMENT SYSTEM TABLE 800

| Tag Name | Field Trip Point 804 | Field Trip Units 806 | Test Date 808 | Test Result 810 | Interval (Since Last Test) 812 |
|---|---|---|---|---|---|
| PS-120 | 140 | PSIG | 1/12/2007 | Pass | 0 |
| PS-120 | 140 | PSIG | 1/12/2008 | Fail | 12 |
| PS-120 | 145 | PSIG | 11/13/2009 | Pass | 11 |
| PS-120 | 145 | PSIG | 1/13/2010 | Pass | 14 |

Failure Rate = 1/ 26280 hr — 850

ASSEMBLY DATA USED FOR SIL CALCULATIONS TABLE 826

| Assembly_Id 828 | Tag Name 830 | ParameterID 832 | Trip Point 834 | Trip Units 836 | Test Interval (Months) 838 | Failure Rate 840 |
|---|---|---|---|---|---|---|
| 10 | PS-120 | 11 | 150 | PSIG | 12 | 1/32,000 hr |
| 20 | PS-122 | 12 | 150 | PSIG | 12 | 1/32,000 hr |
| 30 | SDV-120 | 13 | DEN | | 12 | 1/24,000 hr |
| 40 | SDV-122 | 14 | DEN | | 12 | 1/24,000 hr |

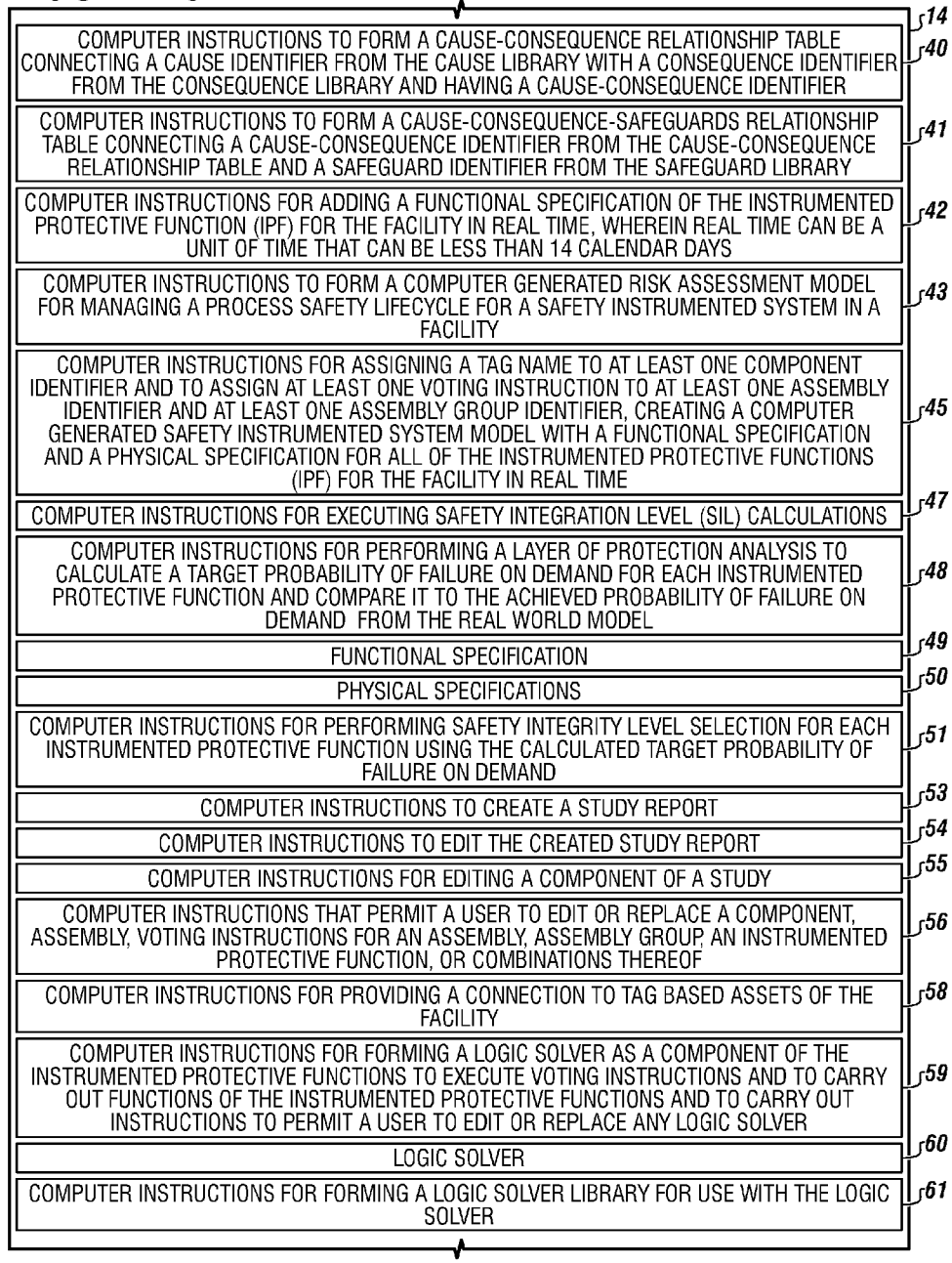

FIGURE 10D

| | |
|---|---|
| COMPONENT LIBRARY | 316 |
| ASSEMBLY GROUP-ASSEMBLY RELATIONSHIP TABLE | 332 |
| ASSEMBLY GROUP LIBRARY | 342 |
| IPF-ASSEMBLY GROUP RELATIONSHIP TABLE | 362 |
| INSTRUMENTED PROTECTIVE FUNCTION (IPF) LIBRARY | 372 |
| SAFETY INTEGRITY LEVEL (SIL) CALCULATION ENGINE | 379 |
| USER ENTERED ASSUMPTIONS FOR EACH IPF | 382 |
| USER SPECIFIED SAFETY INTEGRITY LEVELS | 384 |
| LOCATION TREE | 607 |
| COMPUTER INSTRUCTIONS TO PROVIDE A PAGE IDENTIFIER IN THE SIS MODEL, TO DISPLAY THE MODULE OF THE SIS MODEL THAT A USER IS WITHIN AT ANY TIME, WHICH WILL PROVIDE A HIERARCHY OF MODULES ASSOCIATED WITH THE USER LOCATION | 619 |
| COMPUTER INSTRUCTIONS FOR PROVIDING A LOCATION TREE FOR EACH COMPONENT IN THE MODEL, EACH IPF, EACH ASSEMBLY, EACH ASSEMBLY GROUP AND COMBINATIONS THEREOF | 620 |
| COMPUTER INSTRUCTIONS FOR CONNECTING DATA OF THE PROCESS HAZARD ANALYSIS AND LAYERS OF PROTECTION ANALYSIS TO THE SAFETY INTEGRITY LEVEL CALCULATIONS | 623 |
| COMPUTER INSTRUCTIONS TO GENERATE A SAFETY REQUIREMENTS SPECIFICATION FOR THE SAFETY INSTRUMENTED SYSTEM (SIS) | 627 |
| COMPUTER INSTRUCTIONS TO ALLOW A USER TO EDIT THE SAFETY REQUIREMENTS SPECIFICATION FOR THE SAFETY INSTRUMENTED SYSTEM (SIS) | 629 |
| COMPUTER INSTRUCTIONS TO SUPPORT MANAGEMENT OF CHANGE (MOC) FOR DATA RECORDS IN THE SYSTEM BY SUPPORTING "MASTER" RECORDS, BEING UNTOUCHED WHILE "PROJECT" COPIES OF THE DATA RECORDS ARE EDITED AND MANIPULATED BY USERS | 631 |
| COMPUTER INSTRUCTIONS TO SUPPORT ANALYSIS OF PROTECTION LAYERS TO BE APPLIED TO REDUCE PROBABILITY OF A HAZARDOUS EVENT OCCURRING | 633 |
| COMPUTER INSTRUCTIONS TO INCLUDE ANALYSIS TO CALCULATE THE SAFETY INTEGRITY LEVEL CALCULATIONS REQUIRED TO REDUCE RISK TO A TARGET LEVEL | 635 |
| COMPUTER INSTRUCTIONS TO PERMIT A USER TO CHECK EACH EDITED RECORD, MARK EACH RECORD AS CHECKED, APPROVED, AND THEN MOVE THE CHECKED AND APPROVED RECORD TO "MASTER" RECORDS BY A QUALIFIED USER | 649 |
| STUDY TYPE TABLE | 651 |
| STUDY LIBRARY | 660 |
| NODE LIBRARY | 665 |
| METHODOLOGY TYPE TABLE | 670 |
| CAUSE-CONSEQUENCE RELATIONSHIP TABLE | 676 |
| SESSION LIBRARY | 706 |
| SESSION NODE RELATIONSHIP TABLE | 713 |
| DEVIATION LIBRARY | 729 |
| SCENARIO LIBRARY | 743 |

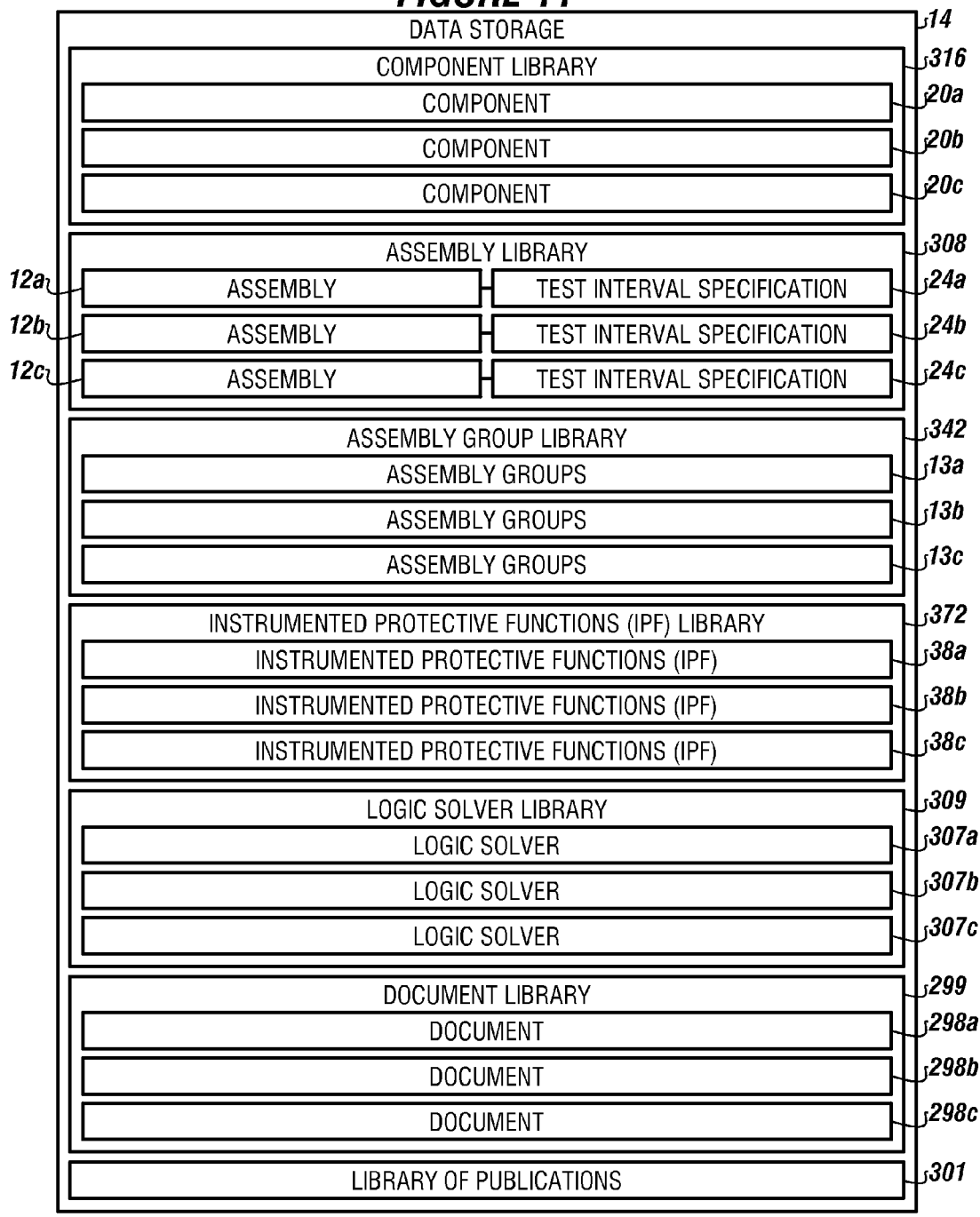

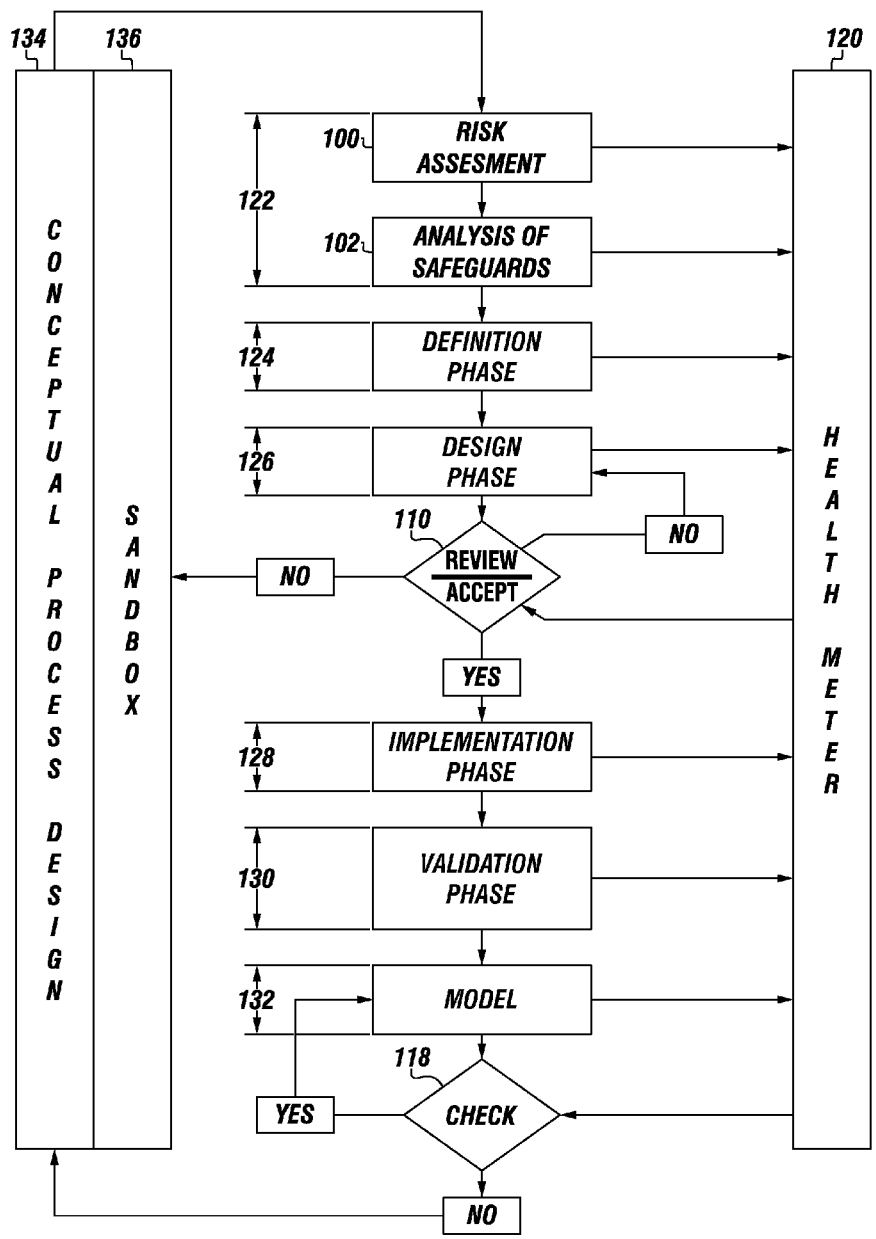

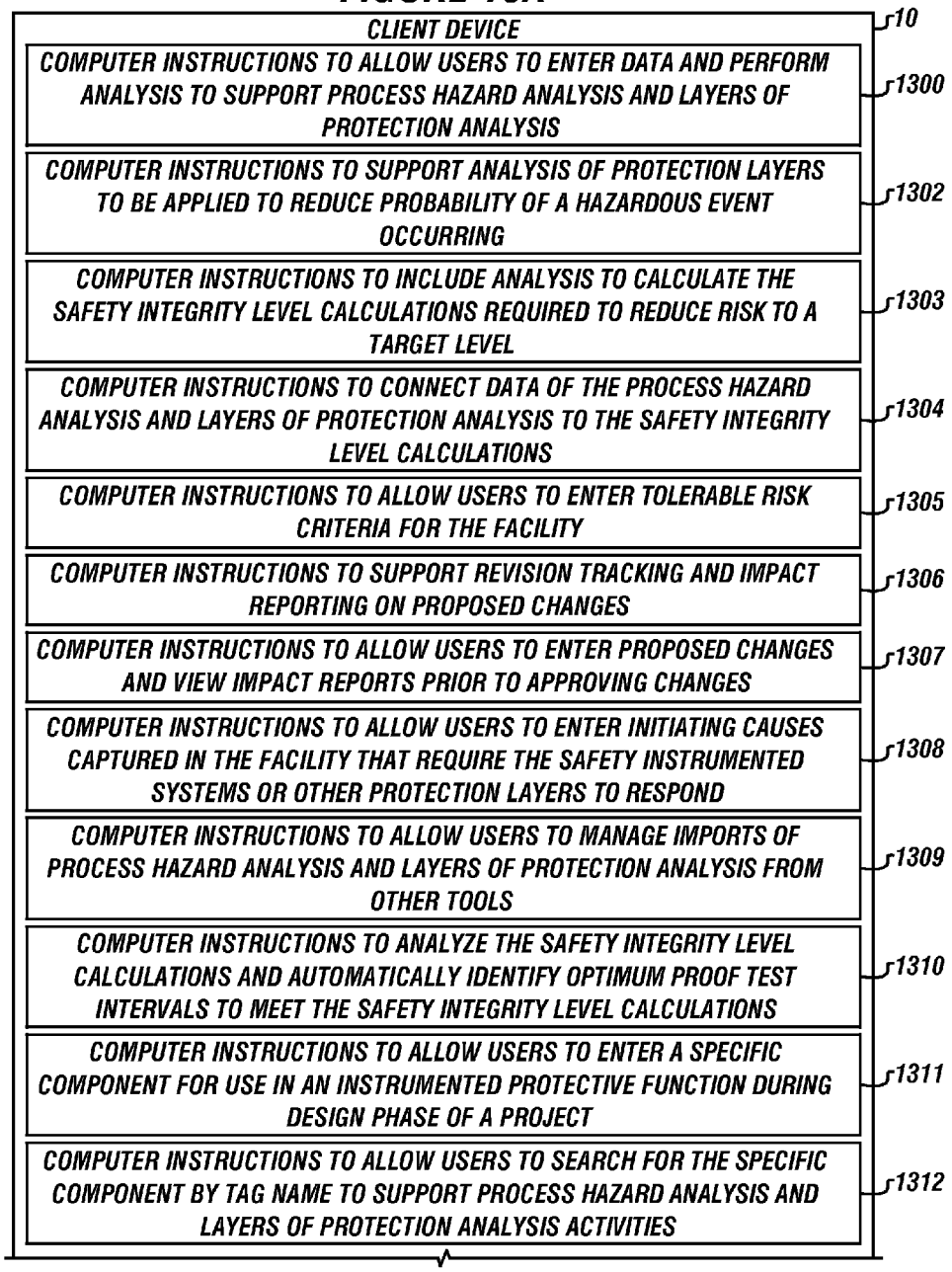

| | |
|---|---|
| COMPUTER INSTRUCTIONS TO GENERATE FACILITY ACCEPTANCE TESTS USING A SOFTWARE MODEL OF PHYSICAL AND FUNCTIONAL SPECIFICATIONS | 1326 |
| SOFTWARE MODEL OF PHYSICAL AND FUNCTIONAL SPECIFICATIONS | 1327 |
| COMPUTER INSTRUCTIONS TO GENERATE SITE ACCEPTANCE TESTS USING THE SOFTWARE MODEL OF PHYSICAL AND FUNCTIONAL SPECIFICATIONS | 1328 |
| COMPUTER INSTRUCTIONS TO GENERATE FUNCTIONAL TEST PLANS FOR EACH SAFETY INSTRUMENTED FUNCTION OF THE INSTRUMENTED PROTECTIVE FUNCTION | 1329 |
| COMPUTER INSTRUCTIONS TO GENERATE A CRITICAL ALARM LIST INCLUDING RISK RANKING OF HAZARDS TO WHICH ALARMS APPLIES | 1330 |
| COMPUTER INSTRUCTIONS TO GENERATE A REPORT OF TEST PERFORMANCE FOR CRITICAL ALARMS | 1331 |
| COMPUTER INSTRUCTIONS TO GENERATE A REPORT SHOWING IMPACT OF BYPASSING ON A RISK GAP BEING OPENED BY PLACING EQUIPMENT IN BYPASS | 1332 |
| COMPUTER INSTRUCTIONS TO CATEGORIZE FAILURES FORM FAILURE RATE ANALYSIS AND PROVIDE STATISTICALLY ANALYZED FAILURE RATES TO BE USED IN SAFETY INTEGRITY LEVEL CALCULATIONS | 1333 |
| COMPUTER INSTRUCTIONS TO ALLOW USERS TO SELECT WHICH SET OF RELIABILITY DATA THEY WANT TO USE | 1334 |
| RELIABILITY LIBRARY | 1335 |
| COMPUTER INSTRUCTIONS AND SYSTEM ARCHITECTURE TO SUPPORT MANAGEMENT OF CHANGE (MOC) OF DATA RECORDS | 1336 |
| COMPUTER INSTRUCTIONS THAT PERMIT A USER TO CHANGE ANY ONE COMPONENT, ONE ASSEMBLY, ONE ASSEMBLY GROUP, OR COMBINATIONS THEREOF OR THE VOTING INSTRUCTIONS OF A TAG BASED SOFTWARE MODEL | 1338 |
| COMPUTER INSTRUCTIONS THAT PROVIDE A CONNECTION TO TAG BASED ASSETS OF THE FACILITY THAT ALLOWS TRANSFER OF DATA FROM TAG BASED ASSETS TO THE DATA STORAGE ASSOCIATED WITH THE PROCESSOR | 1340 |
| COMPUTER INSTRUCTIONS TO USE RELATIONSHIP TABLES AND LIBRARIES TO FORM A CAUSE AND EFFECT REPORT | 1342 |

*FIGURE 13C*

SYSTEM TO BUILD, ANALYZE AND MANAGE A COMPUTER GENERATED RISK ASSESSMENT MODEL AND PERFORM LAYER OF PROTECTION ANALYSIS USING A REAL WORLD MODEL IN SOFTWARE OF A SAFETY INSTRUMENTED SYSTEM ARCHITECTURE

CROSS REFERENCE TO RELATED APPLICATIONS

The present application is a Continuation in Part of co-pending U.S. patent application Ser. No. 13/251,051, filed on Sep. 30, 2011, entitled "SYSTEM TO BUILD, ANALYZE AND MANAGE A REAL WORLD MODEL IN SOFTWARE OF A SAFETY INSTRUMENTED SYSTEMS IN A FACILITY," issued as U.S. Pat. No. 8,521,676 on Aug. 27, 2013, which claims priority to U.S. Provisional Patent Application Ser. No. 61/388,423 and U.S. Provisional Patent Application Ser. No. 61/388,437, both which were filed on Sep. 30, 2013. These references are incorporated herein in their entirety.

FIELD

The present embodiments generally relate to a system to build, analyze, and manage a computer generated risk assessment model and perform layer of protection analysis using a real world model in software of a safety instrumented system (SIS) architecture for a safety instrumented system in a facility.

BACKGROUND

A need exists for a system that can identify a target risk reduction requirements versus achieved results from safety integrity level (SIL) calculations for a facility having a risk assessment and an associated layer of protective analysis (LOPA).

A further need exists for a system that compares test intervals assumed in safety integrity level (SIL) calculations to actual test completions being recorded.

Another need exists for a system which can compare device failure rates assumed in safety integrity level (SIL) calculations versus actual failure rates recorded.

A need exists for a system that provides a downtime estimate for repair on devices, software, or processes, or even an entire facility in safety integrity level (SIL) calculations and compares that downtime estimate to actual availability with actual time in a bypass situation.

A need exists for a system that identifies demand sources and causes named in at least a layer of protective analysis (LOPA), and compare the identified demand sources to actual demands as recorded.

A need exists for a system that identifies safety instrumented system (SIS) lifecycle phases required for projects versus phases of completed projects on a real time dashboard for multiuser viewing.

The present embodiments meet these needs.

BRIEF DESCRIPTION OF THE DRAWINGS

The detailed description will be better understood in conjunction with the accompanying drawings as follows:

FIG. 1A depicts the component library.
FIG. 1B shows the assembly library.
FIG. 1C shows the logic solver library.
FIG. 1D depicts the assembly—component relationship table according to the system.
FIG. 2A is an embodiment of an assembly group library.
FIG. 2B is an embodiment of an assembly group—assembly relationship table.
FIG. 3A shows the instrumented protective function (IPF) library.
FIG. 3B shows an embodiment of the instrumented protective function (IPF)—assembly group relationship table.
FIG. 3C shows a document library according to the invention.
FIG. 3D shows the library of publications used with the system.
FIG. 3E shows a study type table according to the invention.
FIG. 3F shows the methodology type table according to the invention.
FIG. 3G shows a study library used with the system.
FIG. 3H depicts a node library used with the system.
FIG. 3I shows a session library used with the system.
FIG. 3J shows a session—node relationship table of the system.
FIG. 3K depicts a deviation library used with the system.
FIG. 3L depicts a scenario library used with the system.
FIG. 3M depicts a consequence library used with the system.
FIG. 3N depicts a safeguard library used with the system.
FIG. 3O depicts a cause library used with the system.
FIG. 3P depicts a scenario—consequence relationship table used with the system.
FIG. 3Q depicts a scenario—cause relationship table used with the system.
FIG. 3R depicts a cause—consequence relationship table used with the system.
FIG. 3S depicts a cause—consequence—safeguards relationship table used with the system.
FIG. 5 shows an embodiment of a cause and effect report.
FIGS. 7A and 7B are an example of a test plan template that has been modified to a functional test plan.
FIG. 8A shows the facility asset/maintenance management system table.
FIG. 8B shows the assembly data used for a safety integrity level (SIL) calculations table.
FIGS. 10A-10E are details of the data storage and computer instructions contained therein.
FIG. 11 is a representation of the libraries that can be stored in the data storage.
FIG. 12 is the representative sequence of steps used with the system for compliance with an OSHA regulation.
FIGS. 13A-13C depict an embodiment of the client device, which can include various additional computer instructions usable with the executive dashboard.

DETAILED DESCRIPTION OF THE EMBODIMENTS

Figure 4:
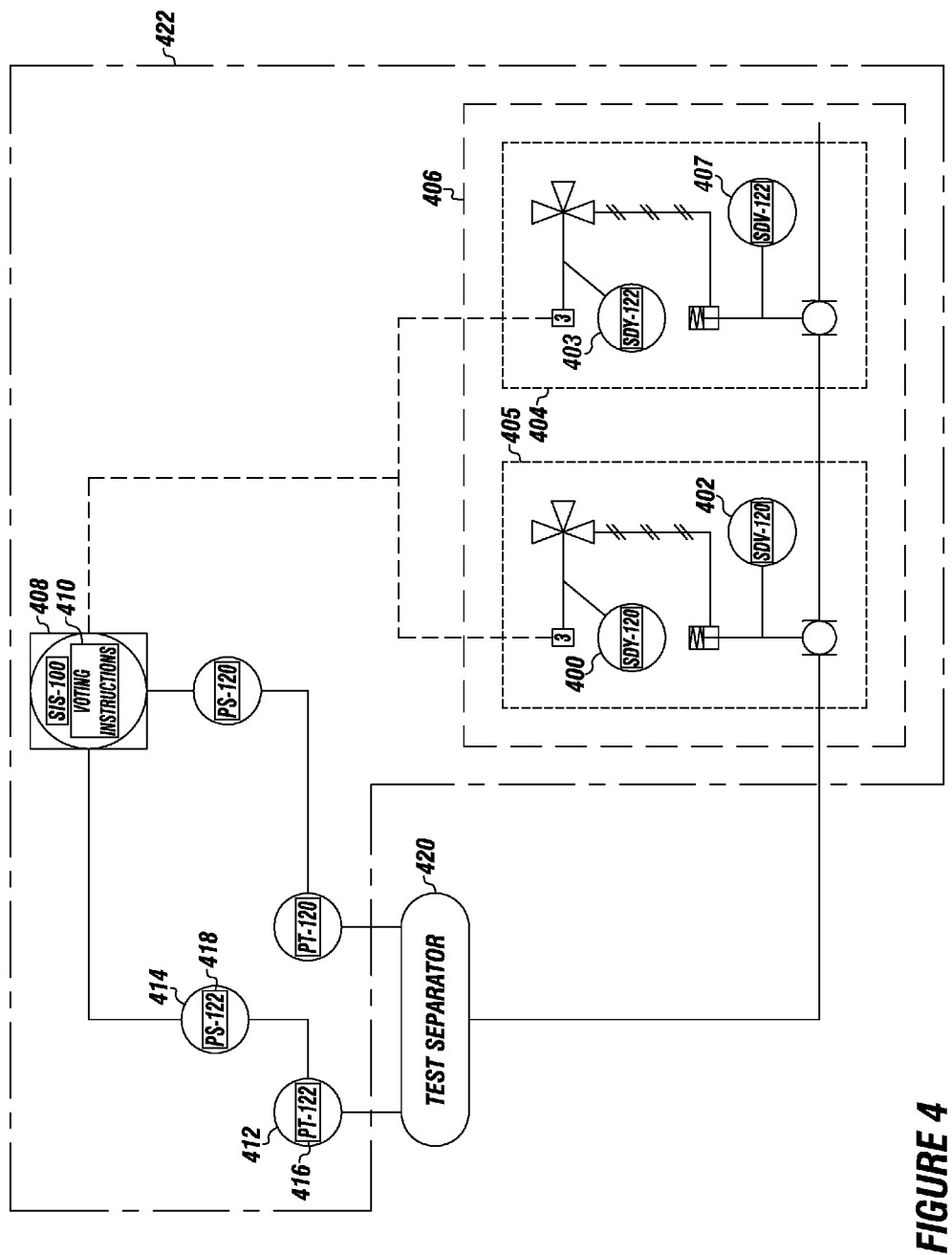
FIG. 4 shows a graphical depiction of a safety instrumented function (SIF).

Before explaining the present system in detail, it is to be understood that the system is not limited to the particular embodiments and that it can be practiced or carried out in various ways.

The present embodiments generally relate to a system to build, analyze, and manage a computer generated risk assessment model and perform layer of protection analysis using a real world model in software of a safety instrumented system (SIS) architecture for a safety instrumented system in a facility.

The term "a computer generated safety instrumented system model for managing a process safety lifecycle for a safety instrumented system in a facility" refers to a computer generated model.

The system helps prevent explosions in a facility by making measurements for safety device that can be used to predict the possibility of loss of containment of dangerous, volatile, and explosive and otherwise hazardous and toxic materials on a hazard by hazard basis.

The system provides a comparison of target risk reduction requirements to achieved results from safety integrity level (SIL) calculations for a facility having a hazard and risk assessment and an associated layer of protective analysis (LOPA).

The system helps prevent environmental spills by predicting when particular devices will become defective.

The system compares test intervals assumed in safety integrity level (SIL) calculations to actual test completions being recorded at a facility.

The system enables facilities to be safer for workers because the system can predict when emissions are more likely to occur.

The system can compare device failure rates assumed in safety integrity level (SIL) calculations versus actual failure rates recorded at a facility.

The system helps prevent the loss of life and injury by identifying which protective layers prevent permanent injuries and loss of life The system provides a downtime estimate for repair of devices, software, processes, or even an entire facility in safety integrity level (SIL) calculations and compares that downtime estimate to actual availability with actual time in a bypass situation.

Had this system been in place on the oil rig in the Gulf of Mexico which caused one of the largest disasters in United States history, the system could have significantly helped in identifying the blow out preventer defect due to its faulty maintenance schedule.

The system could have both (1) alerted rig operators in real time to faulty maintenance, and (2) provided documentation in real time, practically instantaneously, that the rig was late with its preventive maintenance which would have been very helpful to prevent proceeding under the faulty maintenance situation and thereby saving the 11 lives lost and prevented spilling the millions of gallons of oil into the Gulf of Mexico.

The system identifies demand sources and causes named in at least a layer of protective analysis (LOPA), and compares the identified demand sources to actual demands as recorded regarding at least a portion of a facility.

The system identifies safety instrumented system (SIS) lifecycle phases required for projects versus phases of completed projects on a real time dashboard for multiuser viewing.

The embodiments relate to a system to execute and manage process hazard analysis and layer of protection analysis using a computer generated safety instrumented system model for managing a process safety lifecycle for a safety instrumented system (SIS) in a facility, wherein the computer generated safety instrumented system model has at least one instrumented protective function (IPF).

The system includes a processor and a data storage connected to the processor. The processor engages a network to communicate with at least one client device and third party data storage.

The data storage contains computer instructions to import process hazard analysis and layer of protection analysis (PHA and LOPA) data from a third party; computer instructions to allow a user to select a study type which is a process hazard analysis (PHA) study, a hazard and operability (HazOP) study, a layer of protection analysis (LOPA) study or combinations thereof; and computer instructions to form a study type table comprising a plurality of study types selected from the group: study type name, study type description, study type identifier, and combinations thereof.

Also in the data storage are computer instructions to allow a user to select a methodology type which is a consequence based methodology, a cause based methodology, or scenario based methodology; and computer instructions to form a methodology type table comprising a plurality of methodology types from the group: methodology type name, methodology type description, methodology type identified, and combinations thereof.

Also in the data storage are computer instructions to form a study library, wherein the study library comprises a member of the group: a study name, a study description, a study type from the study type table, methodology type from the methodology type table, user location, and combinations thereof, and wherein each study has a study identifier.

In the data storage are also computer instructions to form a node library, wherein the node library comprises a member of the group: node description, node boundaries, process location, design conditions, operating conditions, node number, and combinations thereof, and wherein each node has a node identifier.

Further the data storage contains computer instructions to form a session library, wherein the session library comprises a member of the group: session identifier, session name, session date, session duration, and combinations thereof, and wherein each session has one of the study identifiers from the study library; and computer instructions to form a session—node relationship table to link a member from the session library to at least one node.

The data storage contains computer instructions to form a deviation library, wherein the deviation library comprises a member of the group: a deviation name, a deviation description, a PHA-Xref suffix, and combinations thereof, and wherein each deviation has a deviation identifier.

Also in the data storage are computer instructions to form a scenario library, wherein the scenario library comprises a plurality of scenarios, wherein each scenario has a deviation identifier from the deviation library, a node identifier from the node library, a node number from the node library connected to a PHA-Xref suffix from the deviation library, and a scenario identifier; and computer instructions to form a consequence library, wherein the consequence library has a plurality of consequences, wherein each consequence comprises: a consequence name, a consequence identifier, a consequence description, and a LOPA criteria.

The consequence library may further include a member of the group connected to the consequence, selected from the group consisting of: a safety severity rating, a proposed safety severity rating, a safety total mitigated event likelihood (TMEL) value, a proposed safety TMEL value, a safety mitigated event likelihood (MEL) value, a proposed safety MEL value, a safety risk score, a proposed safety risk score a safety risk reduction factor (RRF), a proposed safety RRF; an environmental severity rating, a proposed environmental severity rating, an environmental TMEL value, a proposed environmental TMEL value, an environmental MEL value, a proposed environmental MEL value, an environmental risk score, a proposed environmental risk score, an environmental RRF, a proposed environmental RRF, a commercial RRF; a commercial severity rating, a proposed commercial severity rating, a commercial TMEL value, a proposed commercial TMEL value, a commercial MEL value, a proposed commercial MEL value, a commercial risk score, a proposed commercial risk score, a proposed commercial RRF, and combinations thereof.

The data storage includes computer instructions to generate a scenario—consequence relationship table connecting a scenario identifier from the scenario library with a consequence identifier from the consequence library.

The data storage contains computer instructions to generate a cause library with a plurality of causes, each cause having a cause identifier, a cause name, a cause description, a cause type, a cause frequency, and a cause remark.

The data storage includes computer instructions to form a scenario—cause relationship table connecting a scenario identifier from the scenario library with a cause identifier from the cause library.

The data storage includes computer instruction to form a cause—consequence relationship table connecting a cause identifier from the cause library with a consequence identifier from the consequence library, and wherein each cause-consequence relationship has a cause—consequence identifier;

Also in the data storage are computer instructions to form a safeguards library with a plurality of safeguards, wherein each safeguard has: a safeguard name, a safeguard description, an independent protection layer (IPL) basis, a safeguard identifier, an IPL type, a probably of failure on demand (PFD) value, and an instrumented protective identifier; and computer instructions to form a cause—consequence—safeguards relationship table connecting a cause—consequence identifier from the cause—consequence relationship table, and a safeguard identifier from the safeguard library.

The data storage includes computer instructions to form computer generated risk assessment model for managing a process safety lifecycle for a safety instrumented system in a facility by: obtaining a deviation name from the deviation library; using the deviation name to obtain from the scenario library a node number connected to a PHA-Xref suffix; obtaining a scenario identified from the scenario library using the deviation name; using the scenario identifier with the scenario—consequence relationship table to obtain a consequence identifier; using the consequence identifier to obtain safety information, environmental information, and commercial information for the deviation; using the scenario—cause relationship table to obtain a cause identifier; using the cause identifier to obtain frequencies from the cause library for each scenario cause relationship record; using the cause identifier from the cause library and the consequence identifier from the consequence library to obtain a cause—consequence identifier from the cause—consequence relationship table; using the cause—consequence—safeguards relationship table to identify at least one safeguard identifier for each identified cause—consequence identifier; using the safeguard identifier to obtain a safeguard IPL type and the PFD from the safeguard library;

The data storage also contains computer instructions in the data storage to assign a tag name to at least one component identifier and to assign at least one voting instruction to at least one assembly identifier and at least one assembly group identifier, creating the computer generated safety instrumented system model with a functional specification and a physical specification for all of the IPFs for the facility in real time.

Computer instructions are in the data storage to execute SIL calculations using: the SIL calculation engine; each component of the facility with a tag name with voting instructions; the functional specifications for each IPF; the physical specifications for each IPF; user entered assumptions for each IPF; and wherein the SIL calculations identify and verify that the SIL calculations are met simultaneously for each IPF using an average probability of failure on demand for the IPF and architectural constraint requirements for the (IPF).

Most uniquely and efficiently, the data storage includes computer instructions for performing a layer of protection analysis to calculate a target probability of failure on demand for each instrumented protective function and compare it to the achieved probability of failure on demand from the real world model, using the safeguard identifier to obtain a safeguard IPL basis and the PFD from the safeguard library; calculating a MEL for each cause—consequence identifier by multiplying the cause frequency by a probability of failure on demand for each safeguard identified in the cause—consequence—safeguard relationship table; calculating a mitigated event likelihood (MEL) for each consequence identifier by summing the mitigated event likelihood (MEL) for each cause—consequence identifier where consequence identifier in the cause—consequence relationship table matches consequence identifier in the consequence library; comparing the MEL for each scenario identifier to a target event likelihood using the safety information, environmental information, and commercial information identified with each consequence identifier to determine if the mitigated event likelihood is less than a target event likelihood; calculating a target PFD required to reduce a MEL to a target event likelihood by dividing the target event likelihood by the MEL when the MEL is greater than a target; and comparing the target PFD from the safeguard library having an IPL type of an IPF to an achieved IPF PFD from the IPF library to identify gaps between the target PFD and the achieved PFD from the real world model.

The system uses computer instructions for performing safety integrity level selection for each instrumented protective function using the calculated target PFD; and computer instructions for editing a component of a study where the component of the study is a member of the group consisting of: a node from the library, a scenario from the scenario library, a cause from the cause library, a consequence from the consequence library, a safeguard from the safeguard library, and a component from a relationship table.

The present embodiments generally relate to a system to computer generate, manage, analyze, or combinations thereof, a software model of a SIS architecture for SISs in a facility, such as a low oxygen shut down interlock architecture for a burner management system in a refinery.

The SIS architecture for a SIS in a facility can include at least one IPF, such as a high stack temperature interlock.

For the purpose of this application the term "instrumented protective function" (IPF) means, an instrumented protective function or other protective layer, for a component, an assembly, an assembly group or combination thereof, such as operator alarm, safety relief valve, or a basic process control interlock.

The term "an average probability of failure on demand" as used herein refers to and average probability for either: an assembly probability of failure on demand as calculated by a SIL calculation engine; a probability of failure on demand (PFD) for the logic solver, calculated assembly group failure on demand, calculated instrumented protective function probability of failure on demand, or combinations thereof.

The term "average probability of failure on demand" refers to the probability or likelihood that the safety function, which can be a connected series of equipment or individual components of the safety function will fail to perform intended functions at the time a hazardous event occurs.

The term "functional specification" for all of the instrumented protective functions for the facility in real time refers to the logic used by the safety instrumented system (SIS) to describe the behavior required from the SIS. The functional specifications define expected changes in output states of the components used in the SIS based on current input component status.

The term "physical specification" for all of the instrumented protective functions for the facility in real time refers to the architecture of the safety instrumented system (S IS) which includes equipment redundancy, equipment types, and installation details.

The term "facility" in this application refers to a chemical plant, refinery or other type of manufacturing facility, transport vehicles, or moveable equipment that are connected or related.

The term "real time," as the term is used herein, refers to a unit of time that can be from 1 day to 30 days in order to make a new evaluation or new SIL calculation as required by the system.

The term "component" and "instrument" can be used interchangeably in this application.

The term "assembly" refers to one or more connected components or instruments.

The term "assembly group" refers to one or more connected assemblies.

The term "test plan" refers to one or more plans to verify that the instrumented protective functions (IPF) are performing as expected. Embodiments of the system can include using multiple test plans in combination to incorporate multiple IPFs to test an entire safety instrumented system (SIS).

The term "safety integrity level" (SIL) refers to a discrete level, one out of four for specifying the safety integrity requirements of a safety instrumented function to be allocated to the safety integrated system. Safety integrity level (SIL) 1 has the lowest level of safety integrity; safety integrity level (SIL) 4 has the highest. See, for example, the definition used in the International Electrotechnical Commission standard known as "IEC" Number 61511-1 from 2002 provides clear definitions of an SIL.

The term "architectural constraint requirements" refers to the redundancy of equipment required to achieve a desired safety integrity level (SIL). Additional redundancy may be required to reach a higher safety integrity levels and maintain instrumented protective function (IPF) architectural constraint requirement for an SIS.

The term "facility historian", as the term is used herein, includes computer software and/or hardware system(s) that are connected to a logic solver (for example the basic process control system that provides continuous control of the facility equipment) that provide continuous collection of potentially large volumes of data and combine advanced data storage and compression techniques to capture and store time-series information in real time that help management evaluate a facility's process operating conditions and make performance decisions.

The system to computer generate a real world model in software can be in support of process safety lifecycle management.

Process safety lifecycle management can be a management process for monitoring and studying the integrity of pieces of equipment, procedures and processes, functions, and software that can be designed for use in a facility and to predict when these items need to be repaired, replaced, cleaned or upgraded or some similar activity to ensure they keep working in their optimum condition and most desirably according to their design specifications.

The system can include a processor and a data storage connected to the processor. The processor can be a laptop or server with a processor.

The data storage can be an integral data storage, a jump drive, or a data storage at another location, remote to the location of the processor.

The system can include computer instructions to create a study report. The system can further include computer instructions to edit the created study report.

The system can include computer instructions to form a component library for the facility and places this library in the data storage.

A component library for a chemical facility, for example, can include reactor heater, reactor pump, valves, sensors, relays, logic solvers, connecting to a control panel to monitor the ingress and egress and the actual transformation of the chemicals in the plant.

Additionally, the system can include computer instructions forming an assembly library for the facility in the data storage. The assembly library can have a test interval specification for each identified assembly.

For example, in a chemical plant, an assembly can be a combination of components, such as element sensors and interposing relays that read and transmit a temperature signal to a logic solver. The test interval specification for that assembly can be every 12 months.

In one or more embodiments, an illustrative system can include computer instructions forming an assembly—component relationship table in the data storage.

The component library and the assembly library can enable the assembly—component relationship table to depict a relationship between one of the assemblies and at least one component and to provide a purpose for each component in each assembly. An example of a purpose can be the function of a sensor component of an assembly.

The system can also include computer instructions for forming an assembly group library for the facility.

Another embodiment of the system can include computer instructions to form an assembly group—assembly relationship table in the data storage wherein the assembly group library and the assembly library enable the assembly group—assembly relationship table to depict a relationship between at least one assembly group and at least one assembly and to provide a parameter for each assembly.

Further, the system can also include computer instructions forming an IPF library for the facility in the data storage.

In yet another embodiment, the system can include computer instructions to form an instrumented protective function—assembly group relationship table wherein the instrumented protective function library and the assembly groups library enable the instrument protective function—assembly group relationship table to depict a relationship between at least one instrumented protective function and at least one assembly group, forming an SIS with at least one IPF, creating a real world model of the IPF.

The system can also include computer instructions forming a logic solver as a component of the IPF to execute voting instructions and to carry out functions of the IPF and to carry out instructions to permit a user to edit or replace any logic solver.

In another embodiment, the system can include computer instructions forming a logic solver library for use with the logic solver.

Turning now to the Figures, FIGS. 1A-1D depict a component library, an assembly library, a logic solver library and an assembly—component relationship table 300 according to the system.

FIG. 1A shows the component library 316 contains the following information: a component identifier 304 for components in the assembly for identifying the component in the system; a tag name 320 for identifying the instrument in a drawing; a component type 322 describes a specific installation and operation at that specific installation; and an equipment type 324.

The component library 316 further contains a name 335 representing an instance of equipment type; a process description 337; an asset identifier 339 for identifying the instrument with a third party system to track the instrument location for maintenance, additional use, cost of ownership, and for use in inventory management, which can be a serial number.

The component library 316 further contains a means for reconciling identifier 341 for component lists with third party software related to the instrument.

FIG. 1B shows the assembly library 308 including the assembly identifier 302 for the assembly for use in the library; a name 312 of the assembly representing at least one component.

The assembly library 308 further includes an assembly type 314 that describes a specific installation and operation at that specific installation; a process description 323 of the assembly, such as separator pressure; a location 325 of the assembly in a facility.

The assembly library 308 further includes an assembly probability of failure on demand (calculated PFD) 327 as calculated by a SIL calculation engine; an assembly based actuator to permit override 329 of the SIL calculation engine in the system and allow manual entry of a probability of failure for that assembly.

The assembly library 308 further includes the document identifier 331 that provides a link to the document library; an overt fault status 333 that can describe a state to transition an assembly to when an overt fault is recognized.

FIG. 1C shows a logic solver library 309 includes a logic solver identifier 311, a logic solver location 313, and a name 315 of a logic solver.

The logic solver further includes a description 317 of the logic solver; a probability of failure on demand (PFD) 319 for the logic solver; and a testing interval 321 to define a required test.

FIG. 1D shows the assembly—component relationship table 300 which can have an assembly identifier 302, the component identifier 304, a purpose 306, and the logic solver 307.

The assembly identifier 302 column can have a value such as 10 extracted from an assembly library.

The purpose 306 column can have a value such as sensor.

The illustrative system can include computer instructions forming an assembly group library for the facility in the data storage.

For example, the assembly group can be two temperature sensing assemblies for a furnace. For example another assembly group can be two fuel gas block valves assembly for the same furnace.

Each assembly group can have a unique identifier and contain one or more assemblies. Each assembly group can be displayed to a user of the system as a description.

FIG. 2A shows the assembly group library 342 which includes: an assembly group identifier 344; a name 346 of each assembly group; voting instruction 348 of each assembly group; and a user entered assumption for an assembly group, such as a test interval 349.

The assembly group library can further include a calculated assembly group failure 351 on demand, the document identifier 331 associated with the assembly group, an assembly group type 360, and combinations thereof.

The system can include computer instructions to form an assembly group—assembly relationship table in the data storage.

These computer instructions can compile data from the assembly group library and the assembly library and create the assembly group—assembly relationship table depicting a relationship between at least one assembly group and at least one assembly and providing a parameter for each assembly.

FIG. 2B provides a detailed depiction of an assembly group—assembly relationship table 332.

The assembly group—assembly relationship table 332 includes: the assembly group identifier 344; the assembly identifier 302; an assembly parameter identifier 352; an assembly parameter value 356; and a parameter unit 358.

The assembly group identifier 344 column can have a value such as 100 extracted from an assembly group library 342.

The assembly identifier 302 column can have a value such as 10 extracted from the assembly library 308.

The assembly parameter identifier 352 column can have a value such as 11 extracted from the assembly group library.

The assembly parameter value 356 column can have a value such as 150. The parameter unit 358 column can have a unit such as PSIG.

FIG. 3A shows an embodiment of the instrumented protective function (IPF) library 372 including a protective layer identifier 374, an instrumented protective function (IPF) name 376, an input group voting instruction 378, and an output group voting instruction 380.

The instrumented protective function (IPF) library 372 can also include a calculated instrumented protective function probability of failure 381 on demand; and an instrumented protective function (IPF) based actuator to permit override 383 of the IPF safety integrity level (SIL) calculation engine in the system and can allow manual entry of a probability of failure for that IPF. The IPF library can include a safeguard identifier 385 from the safeguard library 758.

An example of an instrumented protective function (IPF) can be a low charge flow on a furnace for a refinery.

The system creates an instrumented protective function IPF—assembly group relationship table which can include relationships between at least one IPF and at least one assembly group, forming a safety instrumented system (SIS) with at least one IPF, using the IPF libraries and assembly group library.

Additionally, the system can include computer instructions to compile data from the instrumented protective functions (IPF) library and assembly group library and form an instrumented protective function (IPF)—assembly group relationship table in the data storage.

FIG. 3B shows an embodiment of the IPF—assembly group relationship table 362.

The IPF—assembly group relationship table 362 includes: the IPF identifier 374; an assembly group identifier 344; an IPF to assembly group relationship identifier 375; and an indication 386 that an assembly group can be functioning as additional action, not included in the IPF SIL calculation engine.

The system can include a document library.

FIG. 3C shows an embodiment of a document library.

A documents library 299 includes: a document identifier 331 that provides a link to the document library from another table created by the system.

The library can include an indication of document types 353, a document name 355, and a document description 357.

Some of the document types can be cause and effect diagram documents; safety requirements specification documents; layer of protective analysis document types; test plan procedures; SIL calculation modeling files; override risk assessments; and safety integrity level calculations, or combinations thereof.

FIG. 3D shows the library of publications usable with the system.

The data storage can include a library of publications 301 viewable for compliance including: statutes 290 (US CODE), industry standards 291 (IEC codes), national regulations 292 (CFR 1910.119), business owner specific policies 293, and combinations thereof.

the instrumented protective functions (IPF) library 372, the library of publications 301, the library of documents 299 and the assembly group library 342 enable the IPF—assembly group relationship table 374 to depict the relationship between at least one IPF and at least one assembly group, forming a safety instrumented system (SIS) which can have at least one instrumented protective function (IPF).

In one or more embodiments, the system can include computer instructions that determine functional relationships between assembly groups and assemblies, and create a tag based software model which can have tags and voting instructions, to be used between assembly groups and assemblies.

FIG. 3E shows a study type table according to one or more embodiments.

The study types table 651 includes a study type name 657, such as HazOP; a study type identifier 658, such as 10; a study type description 659, such as analysis based on what could go wrong; and combinations thereof.

FIG. 3F shows a methodology type table 670 according to one or more embodiments.

The methodology type table 670 includes a methodology type name 671, such as cause—based, methodology type description 673, such as Analysis based on identifying one cause with multiple consequences, a methodology type identifier 672, such as 10, and combinations thereof.

FIG. 3G shows a study library usable with the system.

The study library 660 includes a study name 661, such as GV IP Compressor; a study description 662, such as 5-Day HazOP; a study type identifier 658 from the study type table, such as 10; a methodology type identifier 672 from the methodology type table, such as 10, a user location 663, such as 101; and combinations thereof. Each study has a study identifier 664, such as 10.

FIG. 3H depicts a node library usable with the system.

The node library 665 includes a member of the group: node description 666, such as heat exchangers; node boundaries 667, such as piping/vessel; a process location 668, such as comp station; a design condition 669, such as 5,000 PSIG; operating conditions 701, such as 2,000 PSIG; node number 703, such as 300; and combinations thereof. Each node has a node identifier 705, such as 1.

FIG. 3I shows a session library 706 usable with the system.

The session library 706 includes a session name 707, such as session 1; a session date 709, such as 30 Jun. 2013; a session duration 711, such as 72 hours; and combinations thereof. Each session has one of the study identifiers 664, such as 10, from the study library.

FIG. 3J shows a session—node relationship table usable with the system.

The session—node relationship table 713 has a session identifier 674, such as 10, node identifier 705, such as 1.

FIG. 3K depicts a deviation library usable with the system.

The deviation library 729 can include a deviation name 733, such as hi pressure; a deviation description 735, such as more detail; a deviation identifier 675, such as 10; a PHA-Xref suffix 739, such as 1000, and combinations thereof.

FIG. 3L depicts a scenario library usable with the system.

The scenario library 743 has a plurality of scenarios.

Each scenario in the scenario library 743 has a deviation identifier 741 from the deviation library, such as 2; a node identifier 705 from the node library, such as 1; a node number 703 from the node library, such as 300; a PHA-Xref suffix 739 from the deviation library, such as 1000; and a scenario identifier 745, such as 1.

FIG. 3L depicts a consequence library usable with the system.

FIG. 3M depicts the consequence library 747 having a plurality of consequences. Each consequence has a consequence name 748, such as operator error; a consequence identifier 749, such as 1; a consequence description 751, such as gas release; and a LOPA criteria 752, such as yes.

The consequence library 747 can include safety information 753 including but not limited to a safety severity rating, a proposed safety severity rating, a safety TMEL value, a proposed safety TMEL value, a safety MEL value, a proposed safety MEL value, a safety risk score, a proposed safety risk score, a safety risk reduction factor (RRF), a proposed safety RRF, wherein each of these additional elements is connected to a consequence.

The consequence library can include environmental information 754 including but not limited to a environmental severity rating, a proposed environmental severity rating, an environmental TMEL value, a proposed environmental TMEL value, an environmental MEL value, a proposed environmental MEL value, an environmental risk score, a proposed environmental risk score, an environmental RRF, a proposed environmental RRF, wherein each of these additional elements is connected to a consequence.

The consequence library can include commercial information 755 including but not limited to: a commercial severity rating, a proposed commercial severity rating, a commercial TMEL value, a proposed commercial TMEL value, a commercial MEL value, a proposed commercial MEL value, commercial risk score, a proposed commercial risk score, a commercial RRF, and a proposed commercial RRF, wherein each of these additional elements is connected to a consequence.

The following terms are used throughout the application.

The term "LOPA criteria" refers to layers of protection analysis criteria which are defined in the consequence library such as "yes, LOPA required" or "no LOPA required".

As used herein, the term "safety TMEL value" refers to the total mitigated event likelihood for the safety severity of the consequence identified in the consequence library.

As used herein, the term "safety MEL value" refers to the mitigated event likelihood for the safety severity of the consequence identified in the consequence library.

As used herein the term "safety risk score" refers to a risk score corresponding to the safety severity of the consequence identified in the consequence library.

As used herein, the term "environmental TMEL value" refers to the total mitigated event likelihood for the environmental severity of the consequence identified in the consequence library.

As used herein, the term "environmental MEL value" refers to the mitigated event likelihood for the environmental severity of the consequence identified in the consequence library.

As used herein the term "environmental risk score" refers to a risk score corresponding to the environmental severity of the consequence identified in the consequence library.

As used herein, the term "RRF" refers to a risk reduction factor, such as a safety risk reduction factor, a safety risk reduction factor or a commercial risk reduction factor.

As used herein, the term "commercial TMEL value" refers to the total mitigated event likelihood for the commercial severity of the consequence identified in the consequence library.

As used herein, the term "commercial MEL value" refers to the mitigated event likelihood for the commercial severity of the consequence identified in the consequence library.

As used herein the term "commercial risk score" refers to a risk score corresponding to the commercial severity of the consequence identified in the consequence library.

As used herein the term "real world model" refers to the real world model in software of a safety instrumented system architecture for safety instrumented systems in a facility.

FIG. 3N depicts a safeguard library usable with the system.

Each safeguard in the safeguard library 758 has a safeguard name 764, such as IPL—101-100; a safeguard description 765, such as alarm with 30 second operational response; an independent protection layer basis (IPL) 766, such as A30; a safeguard identifier 767, such as 1; an IPL type 768, such as IPL; a probably of failure on demand (PFD) value 769, such as 0.001; and an instrumented protective identifier, such as 1010.

FIG. 3O depicts a cause library used with the system.

Each cause in the cause library 771 has a cause name 773, such as operator failure; a cause identifier 772, such as 1000; a cause description 775, such as human; a cause type 774, such as operator; a cause frequency 776, such as 0.1; and a cause remark 777, such as need sizing basis.

FIG. 3P depicts a scenario—consequence relationship table.

The scenario—consequence relationship table 778 connects a scenario identifier 745 from the scenario library, such as 1, with a consequence identifier 749 from the consequence library, such as 2.

FIG. 3Q depicts a scenario—cause relationship table.

The scenario—cause relationship table 779 connects a scenario identifier 745 from the scenario library, such as 1, with a cause identifier 772 from the cause library, such as 1000.

FIG. 3R depicts a cause—consequence relationship table.

The cause—consequence relationship table 676 connects a cause identifier 772 from the cause library, such as 1000, with a consequence identifier 749 from the consequence library, such as 1, and having a cause—consequence identifier 677, such as 10.

FIG. 3S depicts a cause—consequence—safeguards relationship table.

The cause—consequence—safeguards relationship table 790 connects a cause—consequence identifier 677 from the cause—consequence relationship table, such as 10, and a safeguard identifier 767 from the safeguard library, such as 1.

FIG. 4 shows a graphical depiction of a safety instrumented function (SIF) 422 usable with the system.

A first assembly 405 can include a first component 400, such as SDY-120 and second component 402, such as SDV-120.

The first assembly 405 can be a part of an assembly group 406 with other assemblies such as a second assembly 404, which can have a second instance of a first component 403 and a second instance of the second component 407.

The safety instrumented function 422 can also have a logic solver 408, shown as SIS-100. The logic solver can contain voting instructions 410 which can be the logic used to process signals.

The safety instrumented function 422 can also have additional components. A first instance of a second component 412 is shown with a tag 416 as PT-122.

A second instance of a second component 414 is shown with a tag 418 as PT-122.

The safety instrumented function 420 can also have a test separator 420.

Computer instructions can create a tag based software model that represents the functional specifications for each of the identified instrumented protective functions (IPF) for the facility, for the identified piece of equipment, process or software, or combinations thereof, in real time.

In one or more embodiments, the combinations of libraries and relationship tables can define the physical specifications which can be needed to operate a facility safely with a safety instrumented system.

The term "physical specifications" as the term is used herein refers to the actual hardware, software, process or procedure of the facility and how these elements are actually connected together or used in sequence.

The combination of computer instructions, when actuated, can execute safety integrity level (SIL) calculations based on the physical specifications, voting instructions, and test interval specifications, and determine an average probability of failure on demand for each instrumented protective function (IPF).

As an example, an average probability of failure on demand of an IPF can be $1.57 \times 10^{-2}$ (scientific notation).

As shown in this Figure, the computer instructions permit a user to change any one component, one assembly, one assembly group, or combinations thereof or the voting instructions of the tag based software model.

As shown in this Figure, the computer instructions provide a connection to tag based assets of the facility that can allow transfer of data from tag based asset to the data storage associated with the processor.

The software model can further include a logic solver as a component of the instrumented protective functions (IPF) to execute the voting instructions that carry out the functions of the instrumented protective functions (IPF).

The logic solver provides a voting relationship, essentially a functional relationship, between the assemblies and assembly groups.

The system can also include computer instructions to use the relationship tables and the libraries to form a cause and effect report.

Figure 5:
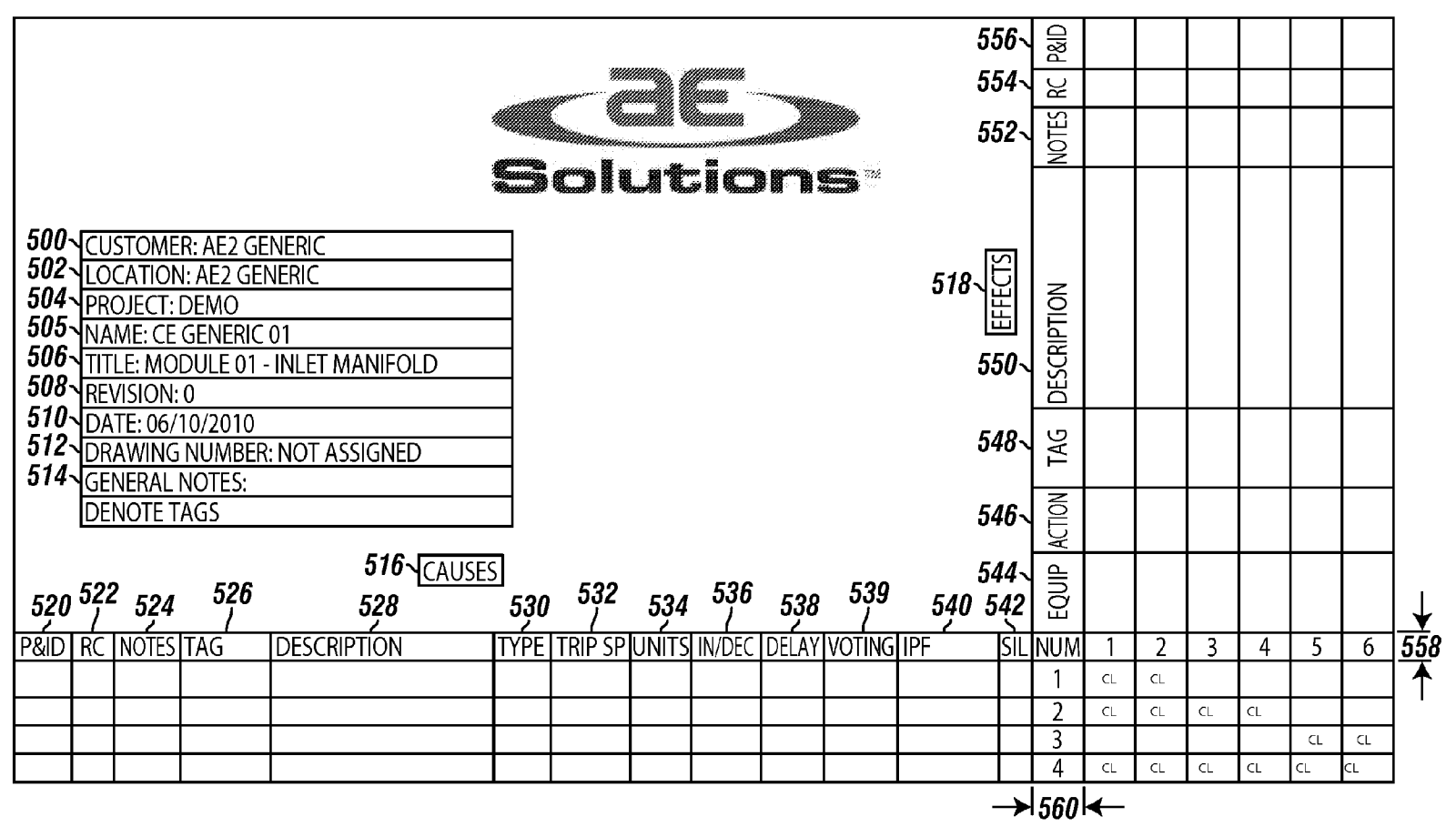

FIG. 5 shows an embodiment of a cause and effect report.

The cause and effect report can have general information such as customer 500, location 502, project 504, name 505, title 506, revision 508, date 510, drawing number 512, and general notes 514.

The cause and effect report can also have a table of causes 516 aligned to intersect a table of effects 518.

The table of causes 516 can have columns for causes P&ID 520, such as 1; causes RC 522, such as 1; causes notes 524, such as 1; causes tag 526, such as PT-100; causes description 528, such as pressure trans; causes type 530, such as PSHH; causes trip SP 532, such as 200; causes units 534, such as PSIG; causes in/Dec 536, such as INC; causes delay 538, such as 2 sec; causes voting 539, such as 1001; causes IPF 540, such as AE-101-001; and causes SIL 542, such as 2.

The table of effects 518 can have columns for effects equip 544, such as PM-100; effects action 546, such as DEN; effects tag 548, such as XV-100; effects description 550, such as fuel gas block valve; effects notes 552, such as 1; effects RC 554, such as 1; and effects P&ID 556, such as 1.

The intersection of the table of causes 516 and the table of effects 518 can have a column titled num 560 and a row titled num 558. The intersections can show causes and any corresponding effects.

Additionally, the system can include computer instructions to generate functional test plans for any one of the assemblies, one or more of the assembly groups, an instrumented protective function (IPF) or designated group of IPFs, and combinations thereof.

The functional test plans can be formulated from one of a plurality of test plan templates that can be preloaded and stored in the data storage. The test plan test plates can be user editable as a feature of this system. This means the user can modify quickly without the need for hiring an outside contractor at great expense and delay to get the information they need fast.

Figure 6:
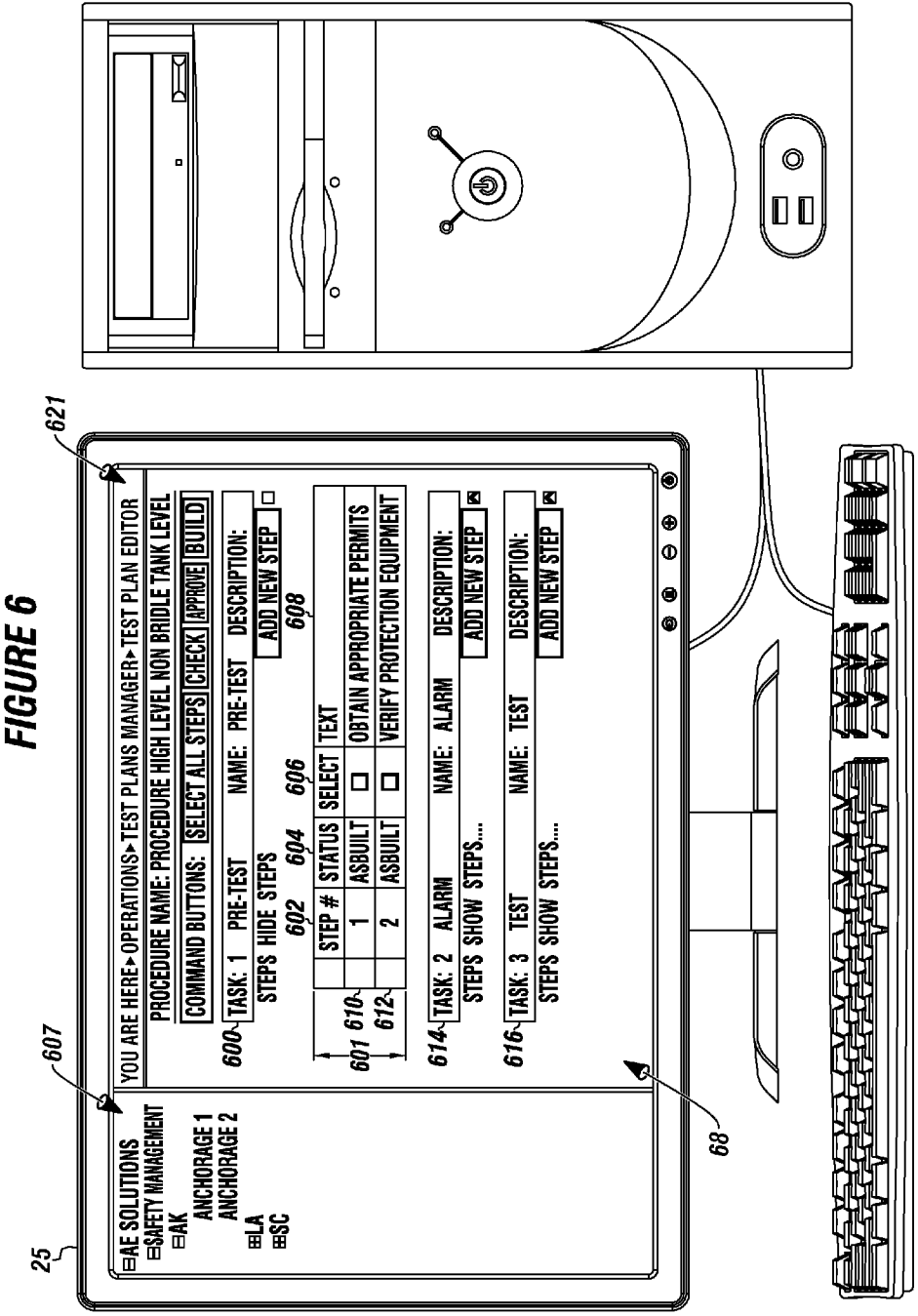
FIG. 6 is a view of a test plan template with a location tree.

FIG. 6 is an example of a test plan template 68.

The system includes computer instructions to provide a location tree 607 on a test plan template for each component in the model, each IPF, each assembly, each assembly group and combinations thereof.

The system includes computer instructions in data storage to provide a page identifier 621 on the test plan template 68.

The page identifier 621 can be used throughout the SIS model to display which module of the SIS model that a user can be within at any time providing a hierarchy of modules associated with the user location.

The test plan template 68 can include one or more tasks, such as first task 600, second task 614, and third task 616, in support of process safety lifecycle management. Each task can include at least one instructional step, depicted here as first instructional step 610 and second instructional step 612, for test plan execution.

The test plan template 68 can include the first task 600, which can have a table of steps 601 with columns for: step number 602, status 604, select 606, and text 608.

The step number 602 column has a value shown as 1, the status 604 column set at a value such as ASBUILT, and the select 606 column can be a check box for selection of the step. The text 608 column can be set to a value such as it appears for this step as obtain appropriate permits.

The test plan template 68 can be presented on a display 25

FIGS. 7A and 7B are an example of a test plan template that has been modified to a functional test plan.

An example functional test plan for an assembly, as shown in FIG. 7A and continued on 7B, can have tables, areas, spaces, or slots for general information about the test plan, such as a facility 720 to identify the associated facility and assembly name 721 to identify the associated assembly.

The functional test plan can also include a test plan name 724 to identify the test plan.

The functional test plan can also include tables, areas, spaces, or slots for process description 726, test plan status and approval information 728, work requirements 730 such as required permits 731, drawings and documents for reference 732, assembly parameters/threshold limits 734, and comments about the assembly 736.

The functional test plan can also include an area to record test results 738.

The functional test plan can also include, as shown in FIG. 7B, an area for sign-off and approval 740.

The functional test plan can include a table of detail information and steps to execute 750. The table can have columns for task 700, step 702, staff 704, check mark box 706, and work method steps 708.

A task such as first task 710 can have multiple steps such as first step 712 and second step 718. The first step 712 can have an associated checkbox 714 to indicate completion of the step and an associated work method step 716 which can describe the step in detail, such as obtain the appropriate permits for the testing and provide the proper notifications to operating personnel regarding the testing, any special requirements, and subsequent alarms that can be generated.

The functional test plan can also include an area for tester comments—additional steps 742 and observed deficiencies and corrective actions 744.

In one or more embodiments, the test plan template can include a plurality of tasks in support of process safety lifecycle management. An example of a task can be opening a neck valve for a test plan template.

Each task can include at least one instructional step for functional test plan execution, or it can have a group of steps to achieve functional test plan execution.

Figure 10A:
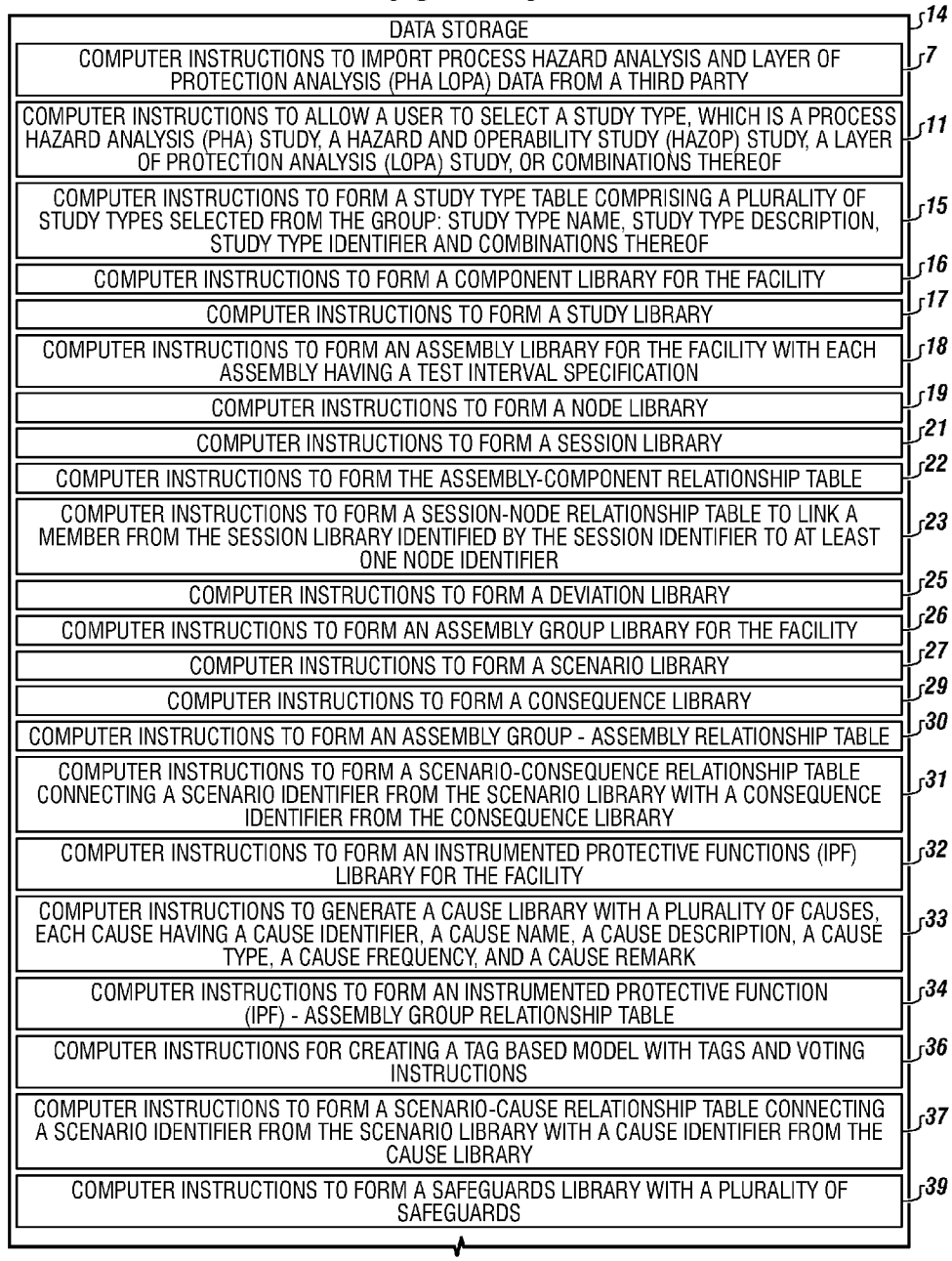
Figure 10C:
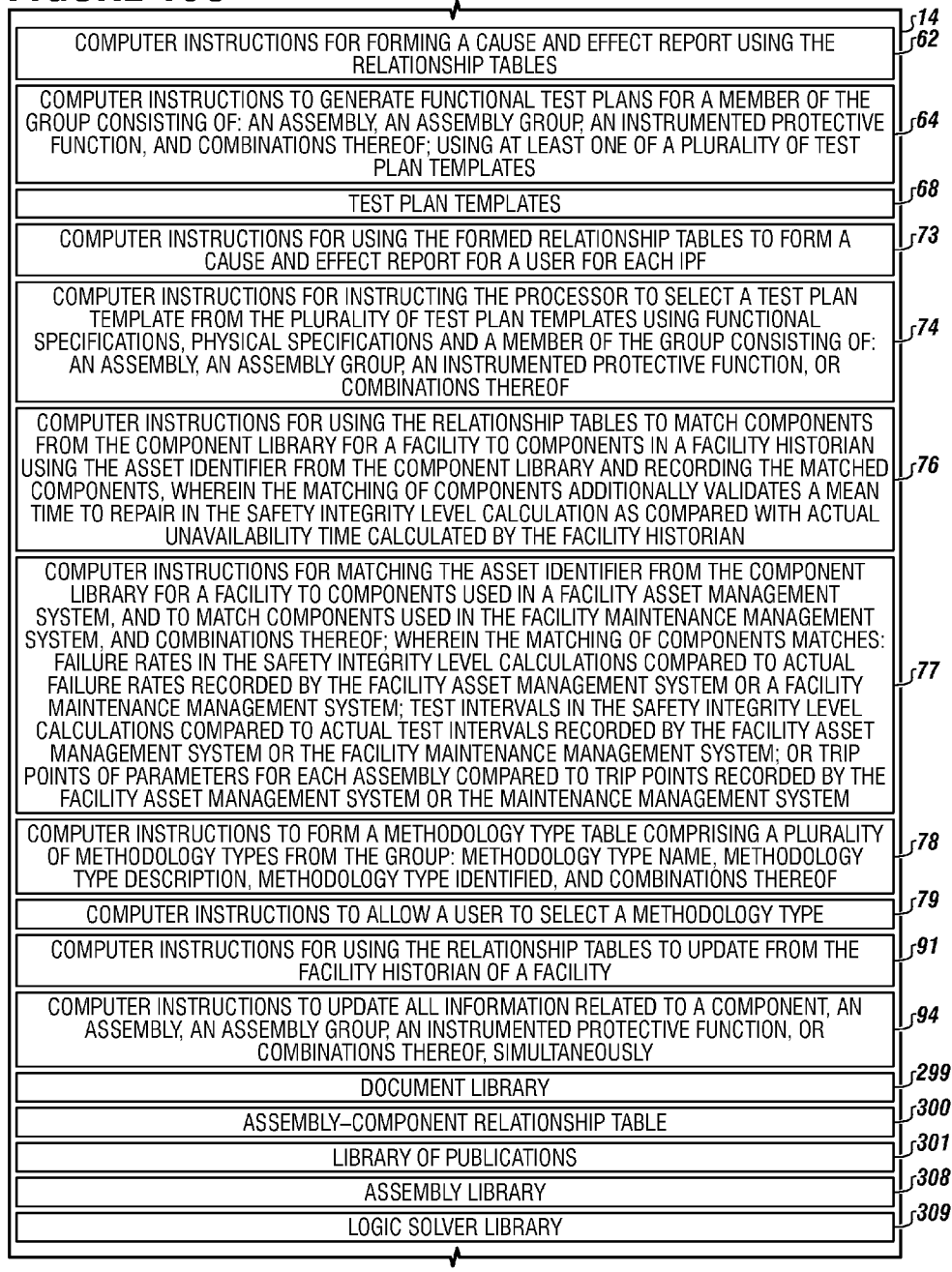
Figure 10E:
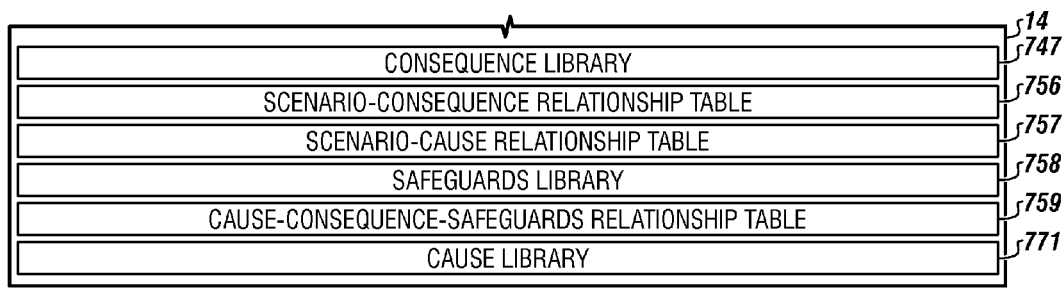

Computer instructions 74 from FIG. 10B can instruct the processor to select a test plan template based on voting instructions from one of the tagged assets of the software model and use physical specifications of an assembly, an assembly group, an IPF, or combinations thereof which can have been identified in the data storage or in the software model.

The computer instructions 76 shown in FIG. 10B use the relationship tables to match components to either components used in a facility asset management system, components used in a facility maintenance management system, or combinations of these components in both facility asset management systems and facility maintenance management systems.

A "facility asset management system", as the term is used herein, includes computer software and/or hardware system(s) that aid in the process of managing tasks and decisions surrounding the purchase, ingestion, annotation, cataloguing, storage, retrieval, maintenance and distribution of physical assets in a facility (for example tracking the life cycle of a temperature sensor in a refinery).

A "facility maintenance management system", as the term is used herein means includes computer software and/or hardware system(s) that aid in managing an organizations maintenance operations in order to help maintenance workers do their jobs more effectively (for example, determining which equipment require maintenance and which storerooms contain the spare parts they need) and to help management make informed decisions (for example, calculating the cost of equipment breakdown repair versus preventive maintenance for the equipment, possibly leading to better allocation of resources).

In one or more embodiments, the matching of components matches failure rates in safety integrity level (SIL) calculations.

For example, the matching of components to safety integrity level SIL calculations can occur by first matching tag names in data storage to tag names in a facility asset management system. Then, that match can allow the failure rate in the data storage to be compared to failure rates being recorded by the facility asset management system.

An example an asset with a tag name PS-120 in the data storage matched to the tag name PS-120 in the facility asset management system. The failure rate for PS-120 in data storage can be 1 in 38,000 hours, and the failure rate for PS-120 in the facility asset management system can be 1 in 24,000 hours.

In one or more embodiments, the matching of components also matches test intervals in SIL calculations compared to actual test intervals in the facility maintenance management system.

An example an asset with a tag name PS-120 in the data storage matched to the tag name PS-120 in the facility maintenance management system. The test interval for PS-120 in data storage can be once every 12 months, and the test interval for PS-120 in the facility maintenance management system can be 1 time every 16 months.

In one or more embodiments, the matching of components compares trip points of parameters for each assembly to trip points recorded in one of the facility asset or maintenance management systems.

An example an asset with a tag name PS-120 in the data storage matched to the tag name PS-120 in the facility asset management system. The trip point for PS-120 in data storage can be 150 psig, and the trip point for PS-120 in the facility asset management system can be 170 psig.

FIGS. 8A and 8B show a representative table produced by the system for users and viewers of the system that matches components of the facility to failure rates in SIL calculations and to those recorded by the facility asset management system, and the facility maintenance management system, as well as trip point parameters for assemblies to recorded trip points, and matches test intervals in SIL calculations to actual test intervals.

FIG. 8A shows the facility asset/maintenance management system table 800 can contain data to calculate a second failure rate 850.

The facility asset/maintenance management system table 800 can have columns: tag name 802, field trip point 804, field trip units 806, test date 808, test result 810, and interval (since last test) 812.

A row in the table can contain values for the tag name 802, such as PS-120, values for the field trip point 804, such as 140, values for the field trip units 806, such as PSIG, values for the interval (since last test) 812, such as 0.

The table can also contain values for the test date 808, such as 'Jan. 12, 2007' and test result 810 such as pass or fail, shown here as pass. These test results and dates can be used to determine the second failure rate 850.

The data from the facility asset/maintenance management system table 800 can be compared to data from an assembly data used for SIL calculations table 826, shown as FIG. 8B.

The data from the facility asset/maintenance management system table 800 can be compared to data from an assembly data used for safety integrity level SIL calculations table 826, shown as FIG. 8B.

FIG. 8B shows the assembly data used for SIL calculations table 826 can include columns for: assembly identifier 828, tag name 830, parameter identifier 832, trip point 834, trip units 836, test interval (months) 838, and a first failure rate 840.

The tag name 830 can have a value, such as PS-120 and the first failure rate 840, such as 1/32,000 hr to compare with the second failure rate 850 calculated using the facility asset/maintenance management system table 800.

The facility asset/maintenance management system table can represent data from a facility asset management system, a facility asset maintenance management system, and combinations thereof.

The system can include computer instructions to use the relationship tables and update a facility historian in the facility data storage of a facility.

The system uses the relationship tables to match components to actual real world components in a facility historian, wherein the matching of components matches, mean time to repair in the SIL calculation compared to actual unavailability time recorded by the facility historian.

For example, a mean time to repair for PS-120 reported in data storage as 72 hours when matched to the actual unavailability time, which can be 14 days according to the facility historian.

Reports can be generated from the compared data, to show continuing problems with lack of inventoried parts, lack of operator training, or lack of adequate contractors to install difficult parts that become defective.

Additionally, the system can use computer instructions to update all instances of at least one component, assembly, assembly group, IPF or combinations thereof, simultaneously.

The term "instances" as used herein includes each occurrence in the data storage where a tagged asset is referenced.

Figure 9:
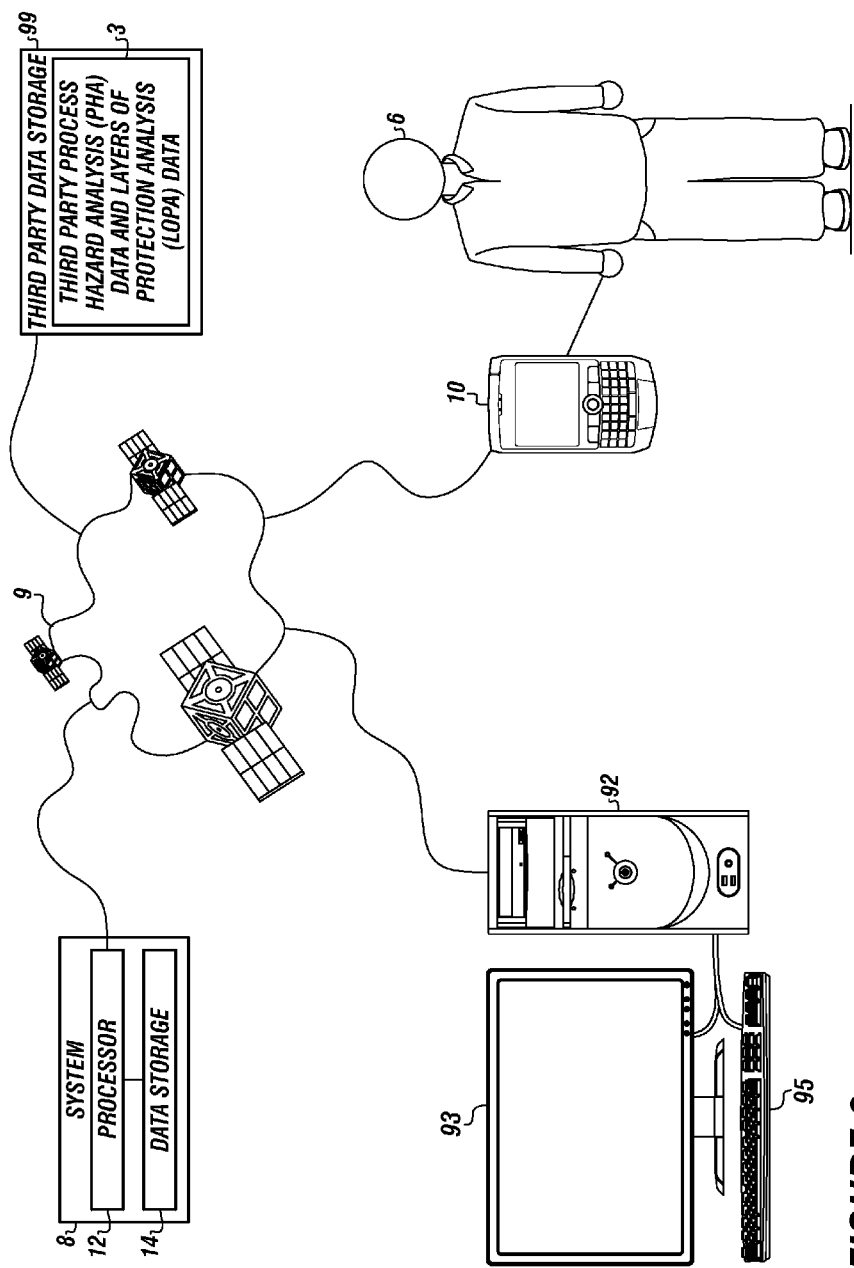
FIG. 9 depicts an overview of the system to computer generate a real world model in software of a safety instrumented system (SIS) architecture for safety instrumented systems in a facility showing the different computer instructions coupled to a facility management system using a network.

FIG. 9 depicts an overview of the system to computer generate a real world model in software of a safety instrumented system (SIS) architecture for SIS in a facility.

In this system, the instrumented protective functions (IPFs) can be safety instrumented functions, environmental instrumented functions, commercial instrumented functions, any other safety function that protects against harm to the environment, commercial assets, people, or combinations thereof.

The system 8 can include a processor 12 connected to a data storage 14. The processor can be in communication with a network 9. At least one client device 10 can be in communication with the network 9. Each client device can have a display for showing the status of compliance. Each client device can be manipulated by a user 6.

In one or more embodiments, a facility processor 92 with facility data storage can be in communication with the network 9. The facility processor can be associated or in communication a facility asset input device 95 and a facility asset display 93.

Figure 14:
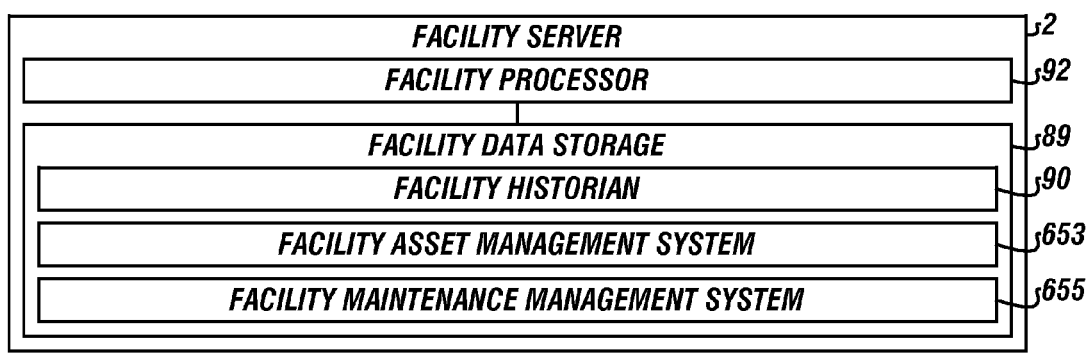
FIG. 14 is an embodiment of a facility server.
The present embodiments are detailed below with reference to the listed Figures.

Also connected to the network 9 can be a facility historian from a facility data storage, as shown in FIG. 14.

Also connected to the network 9 can be a third party process hazard analysis (PHA) data and layers of protection analysis (LOPA) data 3 which can be imported to the system from the third party using computer instructions of the system. The third party PHA LOPA data 3 can be stored in a third party data storage 99 connected to the network.

The facility asset management system and the facility maintenance management system can be used to match components with the computer generated safety instrumented system model.

FIGS. 10A-10E are details of the data storage 14 and the computer instructions contained therein.

The data storage 14 can include computer instructions 7 to import process hazard analysis and layer of protection analysis (PHA LOPA) data from a third party.

The data storage 14 can include computer instructions 11 to allow a user to select a study type, which is a process hazard analysis (PHA) study, a hazard and operability study (HazOP) study, a layer of protection analysis (LOPA) study, or combinations thereof.

The data storage 14 can include computer instructions 15 to form a study type table comprising a plurality of study types selected from the group: study type name, study type description, study type identifier and combinations thereof.

The data storage 14 can include computer instructions 16 to form a component library for the facility.

The data storage 14 can include computer instructions 17 to form a study library. The study library comprises a member of the group a study name, a study description, a study type from the study type table, methodology type from the methodology type table, user location, and combinations thereof, and wherein each study has a study identifier.

The data storage 14 can include computer instructions 18 to form an assembly library for the facility with each assembly having a test interval specification.

The data storage 14 can include computer instructions 19 form a node library. The node library has a node description, node boundaries, process location, design conditions, operating conditions, node number, and combinations thereof, wherein each node has a node identifier.

The data storage 14 can include computer instructions 21 to form a session library. The session library comprises a member of the group: session name, session date, session duration, and combinations thereof, and wherein each session has one of the study identifiers from the study library.

The data storage 14 can include computer instructions 22 to form the assembly—component relationship table. The component library and the assembly library enable the assembly—component relationship table to depict a relationship between one of the assemblies and at least one component and to provide a purpose for each component in each assembly.

The data storage 14 can include computer instructions 23 to form a session—node relationship table to link a member from the session library identified by the session identifier to at least one node identifier.

The data storage 14 can include computer instructions 25 to form a deviation library. The deviation library comprises a member of the group: a deviation identifier, a deviation name, a deviation description, a PHA-Xref suffix, and combinations thereof, and wherein each deviation has a deviation identifier.

The data storage 14 can include computer instructions 26 to form an assembly group library for the facility.

The data storage 14 can include computer instructions 27 to form a scenario library. The scenario library comprises a plurality of scenarios, wherein each scenario has a deviation identifier from the deviation library, a node identifier from the node library, a node number from the node library connected to a PHA-Xref suffix from the deviation library, and a scenario identifier.

The data storage 14 can include computer instructions 29 to form a consequence library. The consequence library has a plurality of consequences, wherein each consequence comprises: a consequence name, a consequence identifier, a consequence description, and a LOPA criteria, and the consequence library may further include a member of the group connected to the consequence, selected from the group consisting of: safety information, environmental information, commercial information, and combinations thereof.

The data storage 14 can include computer instructions 30 to form an assembly group—assembly relationship table. The assembly group library and the assembly library enable the assembly group—assembly relationship table to depict a relationship between at least one assembly group and at least one assembly and to provide a parameter for each assembly.

The data storage 14 can include computer instructions 31 to form a scenario—consequence relationship table connecting a scenario identifier from the scenario library with a consequence identifier from the consequence library.

The data storage 14 can include computer instructions 32 to form an instrumented protective functions (IPF) library for the facility.

The data storage 14 can include computer instructions 33 to generate a cause library with a plurality of causes, each cause having a cause identifier, a cause name, a cause description, a cause type, a cause frequency, and a cause remark.

The data storage 14 can include computer instructions 34 to form an instrumented protective function (IPF)—assembly group relationship table. The instrumented protective function library and the assembly groups library enable the instrumented protective functions—assembly group relationship table to depict a relationship between at least one instrumented protective function and at least one assembly group, forming a safety instrumented system (SIS) with at least one instrumented protective function creating a real world model of the instrumented protective function (IPF).

The data storage 14 can include computer instructions 35 for analyzing functional relationships between assembly groups and assemblies.

The data storage 14 can include computer instructions 36 for creating a tag based model with tags and voting instructions.

The data storage 14 can include computer instructions 37 to form a scenario—cause relationship table connecting a scenario identifier from the scenario library with a cause identifier from the cause library.

The data storage 14 can include computer instructions 39 to form a safeguards library with a plurality of safeguards. Each safeguard has: a safeguard name, a safeguard description, an independent protection layer basis (IPL), safeguard identifier, independent protection layer (IPL) type, and a probably of failure on demand (PFD) value.

The data storage 14 can include computer instructions 40 to form a cause—consequence relationship table connecting a cause identifier from the cause library with a consequence identifier from the consequence library and having a cause—consequence identifier.

The data storage 14 can include computer instructions 41 to form a cause—consequence—safeguards relationship table connecting a cause—consequence identifier from the cause—consequence relationship table and a safeguard identifier from the safeguard library.

The data storage 14 can include computer instructions 42 for adding a functional specification of the instrumented protective function (IPF) for the facility in real time, wherein real time can be a unit of time that can be less than 14 calendar days.

The data storage 14 can include computer instructions 43 to form a computer generated risk assessment model for managing a process safety lifecycle for a safety instrumented system in a facility. Computer instructions 43 can use information from the deviation library including a deviation; information from the scenario library including a node number connected to a PHA-Xref suffix; information from the scenario—consequence relationship table including a consequence identifier; information from the consequence library such as safety information, environmental information, and commercial information; information from the scenario—cause relationship table such as a cause identifier; information from the cause library such as the cause frequency; information from the cause—consequence relationship table such as the cause—consequence identifier; information from the cause—consequence—safeguards relationship table such as the safeguard identifier for each identified cause—consequence identifier; information from the safeguard library such as safeguard IPL type and the PFD from the safeguard library; and combinations thereof.

The data storage 14 can include computer instructions 45 for assigning a tag name to at least one component identifier and to assign at least one voting instruction to at least one assembly identifier and at least one assembly group identifier, creating a computer generated safety instrumented system model with a functional specification and a physical specification for all of the instrumented protective functions (IPF) for the facility in real time.

Voting instructions can refer to a plurality of logical "and" gates and "or" gates used to translate input signals received by the processor into output signals that actuate one or more of protective layers.

The computer instructions 46 for executing SIL calculations that use physical specifications, voting instructions, and test interval specifications to determine an average probability of failure on demand for each instrumented protective function (IPF).

The data storage 14 can include computer instructions 47 for executing safety integration level (SIL) calculations. Computer instructions 47 can use: the safety integration level (SIL) calculation engine; each component of the facility with a tag name with voting instructions; the functional specifications for each IPF; the physical specifications for each IPF; user entered assumptions for each IPF; wherein the SIL calculations identify and verify that the SIL calculations are met simultaneously for each IPF using an average probability of failure on demand for the IPF and architectural constraint requirements for the (IPF).

The data storage 14 can include computer instructions 48 for performing a layer of protection analysis to calculate a target probability of failure on demand for each instrumented protective function and compare it to the achieved probability of failure on demand from the real world model. Computer instruction 48 can use the safeguard identifier to obtain a safeguard IPL basis and the PFD from the safeguard library; calculating a MEL for each cause—consequence identifier by multiplying the cause frequency by a probability of failure on demand for each safeguard identified in the cause—consequence—safeguard relationship table; calculating a mitigated event likelihood (MEL) for each consequence identifier by summing the mitigated event likelihood (MEL) for each cause—consequence identifier where consequence identifier in the cause—consequence relationship table matches consequence identifier in the consequence library; comparing the MEL for each scenario identifier to a target event likelihood using the safety information, environmental information, and commercial information identified with each consequence identifier to determine if the mitigated event likelihood is less than a target event likelihood; calculating a target PFD required to reduce a MEL to a target event likelihood by dividing the target event likelihood by the MEL when the MEL is greater than a target; and comparing the target PFD from the safeguard library having an IPL type of an IPF to an achieved IPF PFD from the IPF library to identify gaps between the target PFD and the achieved PFD from the real world model.

The functional specification 49 for each component can be stored in the data storage 14.

Physical specifications 50 for each component can be stored in the data storage 14.

The data storage 14 can include computer instructions 51 for performing safety integrity level selection for each instrumented protective function using the calculated target probability of failure on demand.

The data storage 14 can include computer instructions 53 to create a study report.

The data storage 14 can include computer instructions 54 to edit the created study report.

The data storage 14 can include computer instructions 55 for editing a component of a study. The component of the study is a member of the group consisting of: a node from the library, a scenario from the scenario library, a cause from the cause library, a consequence from the consequence library, a safeguard from the safeguard library, and a component from a relationship table.

The data storage 14 can include computer instructions 56 that permit a user to edit or replace a component, assembly, voting instructions for an assembly, assembly group, an instrumented protective function, or combinations thereof.

The data storage 14 can include computer instructions 58 for providing a connection to tag based assets of the facility.

The data storage 14 can include computer instructions 59 for forming a logic solver as a component of the instrumented protective functions to execute voting instructions and to carry out functions of the instrumented protective functions and to carry out instructions to permit a user to edit or replace any logic solver.

The system can include a logic solver 60 stored in the data storage 14.

The logic solver can analyze interrelationships between protective layers, assembly groups, and assemblies and be a standalone processor or a virtual machine within the system.

The data storage 14 can include computer instructions 61 for forming a logic solver library for use with the logic solver.

The data storage 14 can include computer instructions 62 for forming a cause and effect report using the relationship tables.

The data storage 14 can include computer instructions 64 to generate functional test plans for a member of the group consisting of: an assembly, an assembly group, an instrumented protective function, and combinations thereof; using at least one of a plurality of test plan templates.

The data storage 14 can include test plan templates 68.

The data storage 14 can include computer instructions 73 for using the formed relationship tables to form a cause and effect report for a user for each IPF.

The data storage 14 can include computer instructions 74 for instructing the processor to select a test plan template from the plurality of test plan templates using functional specifications, physical specifications and a member of the group consisting of: an assembly, an assembly group, an instrumented protective function, or combinations thereof.

The data storage 14 can include computer instructions 76 for using the relationship tables to match components from the component library for a facility to components in a facility historian using the asset identifier from the component library and recording the matched components, wherein the matching of components additionally validates a mean time to repair in the safety integrity level calculation as compared with actual unavailability time calculated by the facility historian.

The data storage 14 can include computer instructions 77 for matching the asset identifier from the component library for a facility to components used in a facility asset management system, and to match components used in the facility maintenance management system, and combinations thereof; wherein the matching of components matches: failure rates in the safety integrity level calculations compared to actual failure rates recorded by the facility asset management system or a facility maintenance management system; test intervals in the safety integrity level calculations compared to actual test intervals recorded by the facility asset management system or the facility maintenance management system; or trip points of parameters for each assembly compared to trip points recorded by the facility asset management system or the maintenance management system.

The data storage 14 can include computer instructions 78 to form a methodology type table comprising a plurality of methodology types from the group: methodology type name, methodology type description, methodology type identified, and combinations thereof.

The data storage 14 can include computer instructions 79 to allow a user to select a methodology type.

The facility asset management system and facility maintenance management system can be part of the system shown in FIG. 9 or part of a separate system transferring data into the system through a network, a manual import, or the like.

The data storage 14 can include computer instructions 91 for using the relationship tables to update from the facility historian of a facility.

The facility historian can be a part of the overall system, or exist outside the system and transfer data into the system through a network, a manual import, or the like. The facility historian can be a database in data storage of a server that connects to a facility to monitor, in real time, process controllers and operations of the facility.

The data storage 14 can include computer instructions 94 to update all information related to a component, an assembly, an assembly group, an instrumented protective function, or combinations thereof, simultaneously.

The data storage 14 can include the document library 299.

The data storage 14 can include the assembly—component relationship table 300.

The data storage 14 can include the library of publications 301, the assembly library 308, the logic solver library 309, the component library 316, the assembly group—assembly relationship table 332, the assembly group library 342, the IPF—assembly group relationship table 362, the instrumented protective function (IPF) library 372, the safety integrity level (SIL) calculation engine 379, the user entered assumptions for each IPF 382, the user specified safety integrity levels 384, and the location tree 607.

The data storage 14 can include computer instructions 619 to provide a page identifier in the SIS model, to display the module of the SIS model that a user is within at any time, which will provide a hierarchy of modules associated with the user location.

The data storage 14 can include the computer instructions 620 for providing a location tree for each component in the model, each IPF, each assembly, each assembly group and combinations thereof.

The data storage 14 can include computer instructions 623 for connecting data of the process hazard analysis and layers of protection analysis to the safety integrity level calculations.

The data storage 14 can include computer instructions 627 to generate a safety requirements specification for the safety instrumented system (SIS).

The data storage 14 can include computer instructions 629 to allow a user to edit the safety requirements specification for the safety instrumented system (SIS).

The data storage 14 can include computer instructions 631 to support management of change (MOC) for data records in the system by supporting "master" records, being untouched while "project" copies of the data records are edited and manipulated by users. This operation is also known as "sandbox."

The data storage 14 can include computer instructions 633 to support analysis of protection layers to be applied to reduce probability of a hazardous event occurring.

The data storage 14 can include computer instructions 635 to include analysis to calculate the safety integrity level calculations required to reduce risk to a target level.

The data storage 14 can include computer instructions 649 to permit a user to check each edited record, mark each record as checked, approved, and then move the checked and approved record to "master" records by a qualified user.

The data storage 14 contains the study type table 651, the study library 660, the node library 665, the methodology type table 670, the cause—consequence relationship table 676, the session library 706, the session node relationship table 713, the deviation library 729, the scenario library 743, the consequence library 747, the scenario—consequence relationship table 756, the scenario—cause relationship table 757, the safeguards library 758, the cause—consequence—safeguards relationship table 759, and the cause library 771, which can be formed by the computer instructions in the data storage.

FIG. 11 is a representation of some of the libraries that can be stored in the data storage 14. Other libraries have already been called out in FIGS. 10A-10E.

The data storage can include the component library 316, which can contain a plurality of components 20*a*, 20*b*, and 20*c*. For example, the component library can include information on a sensor, transmitter, control device, pump, motor, or solenoids.

The data storage can include the assembly library 308, which can contain a plurality of assemblies 12*a*, 12*b*, and 12*c*. Each assembly 12*a*, 12*b*, and 12*c* can have a plurality of test interval specifications 24*a*, 24*b*, and 24*c*, for example a test interval of 30 days. Assemblies represent groups of components connecting a processor to a process of the facility.

The data storage can include the assembly group library 342, which can contain a plurality of assembly groups 13*a*, 13*b*, and 13*c*, such as pairs of sensors.

The data storage can include the instrumented protective functions (IPF) library 372, which can contain a plurality of instrumented protective functions IPFs 38*a*, 38*b*, and 38*c*.

The data storage can include the logic solver library 309, which can contain a plurality of logic solvers 307*a*, 307*b*, and 307*c*.

The data storage can include the document library 299, which can have a plurality of documents 298*a*, 298*b*, and 298*c*.

The data storage can also include the library of publications 301

FIG. 12 shows an embodiment of an overall sequence of steps implemented by the system.

The system acquires a risk assessment 100 for a portion of a specific facility such as refinery.

The system acquires an analysis of safeguards 102 (a LOPA) for the specific facility wherein the LOPA indicates risk, such as portions of the facility that might be prone to loss of human life. The risk assessment and the LOPA make up an assess phase 122.

A definition phase 124 follows the assess phase 122 and involves editing and verifying safety requirement specifications for the safety instrumented system (SIS) with a user interface.

The next phase used by the system can be a design phase 126 that involves using the system to enter and verify an SIS design and optimization using an IPF model with SIL engine for the specific process or portion of the facility.

Reviews and accept or review and decline acceptance of the SIS design, shown here as review and accept 110 for compliance with a statute, a regulation, or a business criteria, such as an OSHA regulation.

Next, the system creates an implementation phase 128, which can include installing an assembly, IPF, or component. Next the system creates a commission and validation phase 130 which commissions the component, assembly, assembly group, or IPF, and then validates the assembly, assembly group, IPF, using a test plan created by the system.

The next step involves operating and maintaining all or a portion of the facility by running the assembly, assembly group, IPF, or component and re-testing the component, assembly, assembly group and/or IPF on a required test interval as documented in a model 132.

The system implements a check 118 which involves checking if the test results from the prior step are acceptable. If they are not, then the user must restart the process from the beginning.

The entire stage from risk assessment 100 to check 118 involves using a conceptual process design 134 in the previously identified data storage which can be accessed through a sandbox 136 in an embodiment.

The sandbox can allow a user to make a series of changes that can be used in the final implementation in order to evaluate potential changes to the component, assembly, assembly group, and impact on achieved SIL.

Additionally a health meter 120 can monitor the entire sequence of steps, wherein the health meter provides verification and integration and a checking of reality versus plan codes, standards and recognized good engineering practices in real time constantly during the entire process.

For this unique system, the computer instructions, when actuated, can execute safety integrity level (SIL) calculations for each asset of the facility can have a tag with voting instructions based on the functional specification, the physical specification, and user entered assumptions to determine an average probability of failure on demand and architectural restraint requirements for each instrumented protective function (IPF) and validate the assumptions used in the SIL calculations by comparing to actual performance of each IPF in the facility.

An embodiment can include computer instructions to categorize failures (failure rate analysis) and provide statistically analyzed failure rates to be used in SIL calculations.

An embodiment can include computer instructions to allow users to select which set of reliability data they want to use, the data stored in the reliability library in the data storage, the data collected from their facility and analyzed in by the failure rate analysis portion of the system, or user entered data.

An embodiment can include computer instructions and system architecture to support management of change (MOC) of data records in the system.

The system can support "asbuilt" or "master" records being untouched while "project" copies of the records can be edited and manipulated by users, also known as "sandbox."

Each edited record can be checked, approved, and then moved to "asbuilt" by qualified users.

"Qualified users" can mean users with sufficient permissions and roles tied to their login indicating they are able to perform the check and approve activities. Previous "asbuilt" versions of the records can be archived to maintain revision history.

An embodiment can include computer instructions to allow users to enter data and perform analysis to support PHA and LOPA.

An embodiment can include computer instructions to support analysis of protective layers to be applied to reduce probability of a hazardous event occurring.

An embodiment can include computer instructions to include analysis to calculate SIL required to reduce the risk to target level.

An embodiment can include computer instructions to connect the data of the PHA and LOPA to the SIL Calculation portion of the application.

An embodiment can include computer instructions to allow users to enter tolerable risk criteria for their organization.

An embodiment can include computer instructions to support revision tracking and impact reporting on proposed changes.

An embodiment can include computer instructions to allow users to enter proposed changes and view impact reports prior to approving the change.

An embodiment can include computer instructions to allow users to enter initiating causes captured in the facility which required the SIS or other protective layers to respond.

An embodiment can include computer instructions to allow users to manage imports of PHA and LOPA import from other tools.

An embodiment can include computer instructions to analyze SIL calculations and automatically identify optimum proof test intervals that can still meet SIL.

An embodiment can include computer instructions to allow a user to enter relief valve sizing basis during design phase of a project.

An embodiment can include computer instructions to allow users to search for a relief valve sizing basis by tag name to support PHA/LOPA activities.

An embodiment can include computer instructions to create a report showing relief valve sizing basis for all relief valves used for risk reduction in a PHA/LOPA for a facility.

Figure 13B:
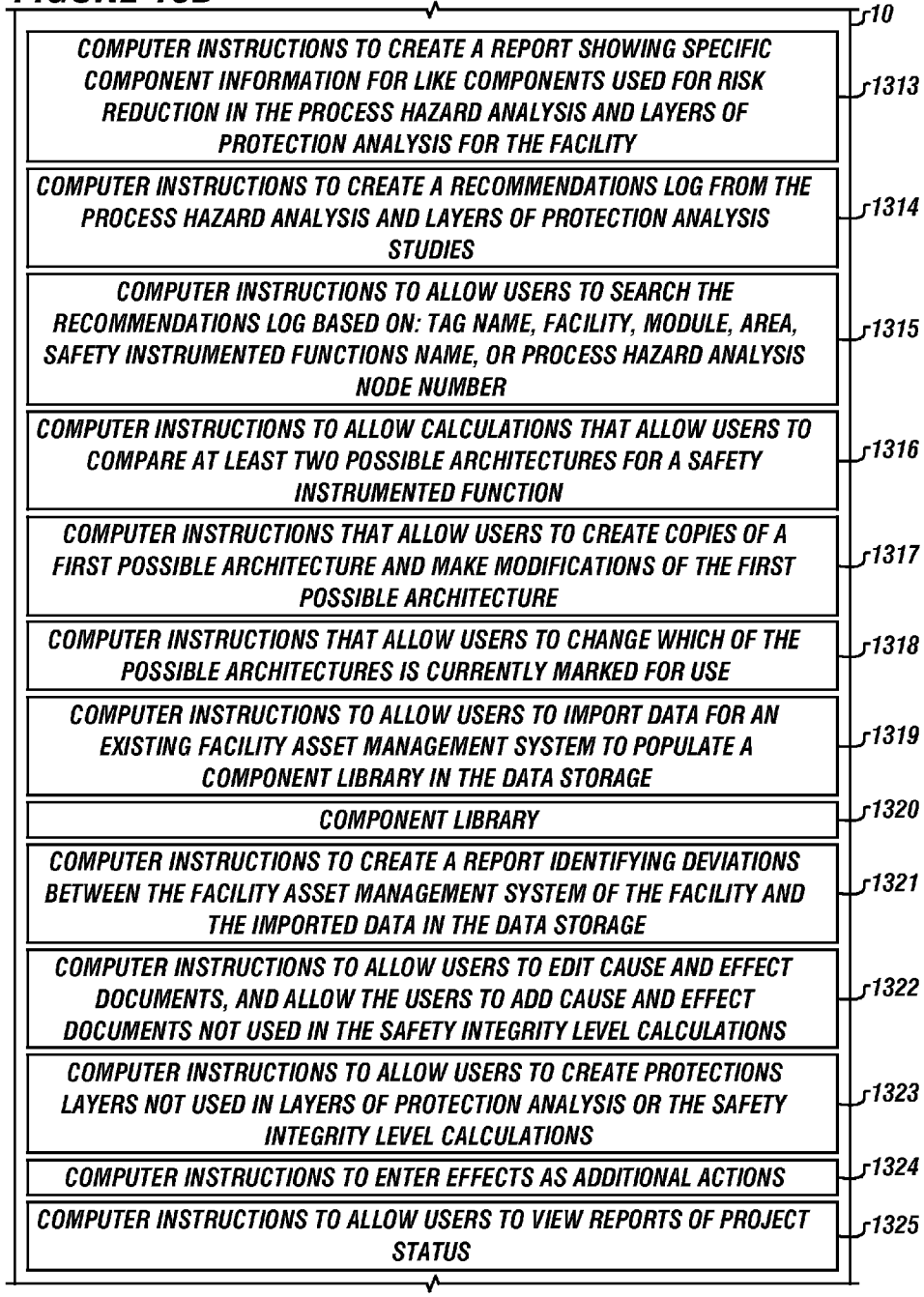

FIGS. 13A-13C depict an embodiment of the client device 10, which can include various additional computer instructions usable with the executive dashboard.

The client device 10 can include computer instructions 1300 to allow users to enter data and perform analysis to support process hazard analysis and layers of protection analysis.

The client device 10 can include computer instructions 1302 to support analysis of protection layers to be applied to reduce probability of a hazardous event occurring.

The client device 10 can include computer instructions 1303 to include analysis to calculate the safety integrity level calculations required to reduce risk to a target level.

The client device 10 can include computer instructions 1304 to connect data of the process hazard analysis and layers of protection analysis to the safety integrity level calculations.

The client device 10 can include computer instructions 1305 to allow users to enter tolerable risk criteria for the facility.

The client device 10 can include computer instructions 1306 to support revision tracking and impact reporting on proposed changes.

The client device 10 can include computer instructions 1307 to allow users to enter proposed changes and view impact reports prior to approving changes.

The client device 10 can include computer instructions 1308 to allow users to enter initiating causes captured in the facility that require the safety instrumented systems or other protection layers to respond.

The client device 10 can include computer instructions 1309 to allow users to manage imports of process hazard analysis and layers of protection analysis from other tools.

The client device 10 can include computer instructions 1310 to analyze the safety integrity level calculations and automatically identify optimum proof test intervals to meet the safety integrity level calculations.

The client device 10 can include computer instructions 1311 to allow users to enter a specific component for use in an instrumented protective function during design phase of a project.

The client device 10 can include computer instructions 1312 to allow users to search for the specific component by tag name to support process hazard analysis and layers of protection analysis activities.

The client device 10 can include computer instructions 1313 to create a report showing specific component information for like components used for risk reduction in the process hazard analysis and layers of protection analysis for the facility.

The client device 10 can include computer instructions 1314 to create a recommendations log from the process hazard analysis and layers of protection analysis studies.

The client device 10 can include computer instructions 1315 to allow users to search the recommendations log based on: tag name, facility, module, area, safety instrumented functions name, or process hazard analysis node number.

The client device 10 can include computer instructions 1316 to allow calculations that allow users to compare at least two possible architectures for a safety instrumented function.

The client device 10 can include computer instructions 1317 that allow users to create copies of a first possible architecture and make modifications of the first possible architecture.

The client device 10 can include computer instructions 1318 that allow users to change which of the possible architectures is currently marked for use.

The client device 10 can include computer instructions 1319 to allow users to import data for an existing facility asset management system to populate a component library in the data storage.

The client device 10 can include the component library 1320.

The client device 10 can include computer instructions 1321 to create a report identifying deviations between the facility asset management system of the facility and the imported data in the data storage.

The client device 10 can include computer instructions 1322 to allow users to edit cause and effect documents, and allow the users to add cause and effect documents not used in the safety integrity level calculations.

The client device 10 can include computer instructions 1323 to allow users to create protections layers not used in layers of protection analysis or the safety integrity level calculations.

The client device 10 can include computer instructions 1324 to enter effects as additional actions.

The client device 10 can include computer instructions 1325 to allow users to view reports of project status.

The client device 10 can include computer instructions 1326 to generate facility acceptance tests using a software model of physical and functional specifications.

The client device 10 can include a software model of physical and functional specifications 1327.

The client device 10 can include computer instructions 1328 to generate site acceptance tests using the software model of physical and functional specifications.

The client device 10 can include computer instructions 1329 to generate functional test plans for each safety instrumented function of the instrumented protective function.

The client device 10 can include computer instructions 1330 to generate a critical alarm list including risk ranking of hazards to which alarms applies.

The client device 10 can include computer instructions 1331 to generate a report of test performance for critical alarms.

The client device 10 can include computer instructions 1332 to generate a report showing impact of bypassing on a risk gap being opened by placing equipment in bypass.

In one or more embodiments, the client device 10 can include computer instructions 1333 to categorize failures form failure rate analysis and provide statistically analyzed failure rates to be used in safety integrity level calculations.

The client device 10 can include computer instructions 1334 to allow users to select which set of reliability data they want to use. For example, the users can select from data stored in a reliability library 1335, data collected from the facility and analyzed by failure rate analysis, or user entered data.

The client device 10 can include computer instructions 1336 and system architecture to support management of change (MOC) of data records.

For example, the client device 10 can support "asbuilt" or "master records" remaining untouched while "project" copies of records can be edited and manipulated by users. Each edited record can be checked, approved, and then moved to "asbuilt" by qualified users. Qualified users can include users with sufficient permissions and roles tied to their respective login indicating that they can be able to perform the check and approve activities. Previous "asbuilt" versions of records can be archived to maintain a revision history.

The client device 10 can include computer instructions 1338 that permit a user to change any one component, one assembly, one assembly group, or combinations thereof or the voting instructions of a tag based software model.

The client device 10 can include computer instructions 1340 that provide a connection to tag based assets of the facility that can allow transfer of data from tag based assets to the data storage associated with the processor.

The client device 10 can include computer instructions 1342 to use relationship tables and libraries to form a cause and effect report.

FIG. 14 is an embodiment of a facility server 2.

The facility server 2 can include a facility data storage 89 and a facility processor 92.

The facility data storage 89 can connect with the facility processor 92.

The facility data storage 89 can include the facility historian 90, the facility asset management system 653, and the facility maintenance management system 655.

An example of the computer instructions 43 to form computer generated risk assessment model for managing a process safety lifecycle for a safety instrumented system in a facility is as follows:

Obtaining a deviation name from the deviation library, such as high pressure for component such as a high pressure separator.

Using the deviation name to obtaining from the scenario library a node number connected to a PHAX ref suffix such as HP5.101. and the scenario identifier such as 1001 from the scenario library.

Using the scenario identifier and the scenario—consequence relationship table, pick a consequence identifier, such as 2.

From the consequence library, using the consequence identifier to obtain safety information, environmental information, and commercial information, for the deviation, for example the information can be a safety severity rating 3, environmental severity rating 2 and commercial severity rating 4.

Using the scenario—cause relationship table to obtain a cause identifier, such as 1000.

Using the cause identifier to obtain because frequencies from the cause library for each scenario cause relationship record, such as 0.1.

Using the cause identifier such as 1000 and the consequence identifier such as 2 to obtain a cause—consequence identifier such as 10.

Using the cause—consequence—safeguards relationship table to identify at least one safeguard identifier for each identified cause—consequence identifier such as safeguard identifier 1 and cause—consequence identifier 10.

Using the safeguard identifier to obtain a safeguard IPL type and the probability of failure on demand from the safeguard library. For example, the IPL type is BPCS failure and the PFD is 0.01.

Also an example of the computer instructions 48 for performing layer of protection analysis to calculate a target probability of failure on demand for each instrumented protective function and compare it to the achieved probability of failure on demand from the real world model are as follows:

Using the safeguard identifier to obtain a safeguard IPL basis and the probability of failure on demand (PFD) from the safeguard library. For example, the IPL type is IPF and the probability of failure on demand (PFD) is 0.001.

Calculating a mitigated event likelihood (MEL) for each cause—consequence identifier by multiplying the cause frequency by a probability of failure on demand for each safeguard identified in the cause—consequence—safeguard relationship table.

For example, cause frequencies can be 0.1 for cause of operator error with a consequence of vessel rupture, and a safeguard of BPCS interlock with probability of failure on demand of 0.1 resulting in a calculated MEL of 0.01 for this cause—consequence identifier.

A second cause—consequence identifier for example can have cause frequency 0.1 for cause of control loop failure with a consequence of vessel rupture, and a safeguard of relief valve with probability of failure on demand of 0.01 resulting in a calculated MEL of 0.001 for this cause consequence identifier.

Calculating a mitigated event likelihood (MEL) for each consequence identifier by summing the mitigated event likelihood (MEL) for each cause—consequence identifier where consequence identifier in the cause—consequence relationship table matches consequence identifier in the consequence library.

For example for consequence of vessel rupture the mitigated event likelihood MEL for each cause—consequence such as 0.01 for cause of operator error with a consequence of vessel rupture, and 0.001 for cause of control loop failure with a consequence of vessel rupture, are summed resulting in a mitigated event likelihood MEL for the consequence of vessel rupture of 0.011.

Next, the mitigated event likelihood (MEL) just calculated for each consequence identifier is used to be compared to a target event likelihood using the safety information, environmental information and commercial information identified with each consequence identifier to determine if the mitigated event likelihood is less than a target event likelihood.

For example, for a consequence of high pressure in a separator resulting in vessel rupture in a refinery, a safety severity rating of 3 may indicate a target event likelihood of 0.001. An environmental severity rating of 2 may indicate a target event likelihood of 0.01. A commercial severity rating of 4 may indicate a target event likelihood of 0.001.

That combination results in an overall target event likelihood of 0.001.

Comparing the target event likelihood of 0.001 and the mitigated likelihood event of 0.011 indicates that mitigated event likelihood is greater than the target event likelihood.

When a mitigated event likelihood is greater than a target; a target probability of failure on demand (PFD) required to reduce a mitigated event likelihood (MEL) to a target event likelihood is calculated by dividing the target event likelihood by the mitigated event likelihood.

For a mitigated event likelihood of 0.011, and a target event likelihood of 0.001, the target is divided by the mitigated event likelihood, arriving at a target probability of failure on demand of 0.091.

Next, the target probability of failure on demand (PFD) from the safeguard library is having an IPL type of an instrumented protective function is compared to an achieved instrumented protective function probability of failure on demand from the IPF library, calculated by using the real world model, to identify gaps between the target and the achieved probably of failure on demand (PFD);

For example, the target probability of failure on demand (PFD) of 0.091 from a safeguard library is compared to the achieved instrumented protective function probability of failure on demand from the instrumented protective function of 0.9, by dividing the target by the achieved, to identify a gap between target and achieved PFD wherein the gap value is 0.101.

While these embodiments have been described with emphasis on the embodiments, it should be understood that within the scope of the appended claims, the embodiments might be practiced other than as specifically described herein.

What is claimed is:

1. A system to build, analyze, and manage a computer generated risk assessment model and perform a layer of protection analysis using a computer generated safety instrumented system model for managing a process safety lifecycle for a safety instrumented system in a facility, wherein the computer generated safety instrumented system model has at least one instrumented protective function, and wherein the system comprises:
   a. a processor;
   b. a data storage connected to the processor that engages a network to communicate with at least one client device;
   c. computer instructions to import process hazard analysis and layer of protection analysis data from a third party;
   d. computer instructions to allow a user to select a study type which is a process hazard analysis study, a hazard and operability study, a layer of protection analysis study, or combinations thereof;
   e. computer instructions to form a study type table comprising a plurality of study types selected from the group: a study type name, a study type description, a study type identifier, and combinations thereof;

f. computer instructions to allow the user to select a methodology type which is a consequence based methodology, a cause based methodology, or scenario based methodology;

g. computer instructions to form a methodology type table comprising a plurality of methodology types from the group: a methodology type name, a methodology type description, a methodology type identifier, and combinations thereof;

h. computer instructions to form a study library, wherein the study library comprises a member of the group: a study name, a study description, a study type identifier from the study type table, the methodology type identifier from the methodology type table, a user location, and combinations thereof, and wherein each study has a study identifier;

i. computer instructions to form a node library, wherein the node library comprises a member of the group: a node description, a node boundaries, a process location, a design conditions, an operating conditions, a node number, and combinations thereof, and wherein each node has a node identifier;

j. computer instructions to form a session library, wherein the session library comprises a member of the group: a session identifier, a session name, a session date, a session duration, and combinations thereof, and wherein each session has one of the study identifiers from the study library;

k. computer instructions to form a session—node relationship table to link a member from the session library to at least one node;

l. computer instructions to form a deviation library, wherein the deviation library comprises a member of the group: a deviation name, a deviation description, a PHA-Xref suffix, and combinations thereof, and wherein each deviation has a deviation identifier;

m. computer instructions to form a scenario library, wherein the scenario library comprises a plurality of scenarios, wherein each scenario has the deviation identifier from the deviation library, the node identifier from the node library, the node number from the node library connected to the PHA-Xref suffix from the deviation library, and a scenario identifier;

n. computer instructions to form a consequence library, wherein the consequence library has a plurality of consequences, wherein each consequence comprises: a consequence name, a consequence identifier, a consequence description, and a layer of protection analysis criteria, and the consequence library further includes a member of the group connected to the consequence, selected from the group consisting of:

i. safety information including:
      a safety severity rating, a proposed safety severity rating, a safety total mitigated event likelihood value, a proposed safety total mitigated event likelihood value, a safety mitigated event likelihood value, a proposed safety mitigated event likelihood value, a safety risk score, a proposed safety risk score, a safety risk reduction factor, a proposed safety risk reduction factor, and combinations thereof;

ii. environmental information including:
      an environmental severity rating, a proposed environmental severity rating, an environmental total mitigated event likelihood value, a proposed environmental total mitigated event likelihood value, an environmental mitigated event likelihood value, a proposed environmental mitigated event likelihood value, an environmental risk score, a proposed environmental risk score, an environmental risk reduction factor, a proposed environmental risk reduction factor, and combinations thereof;

iii. commercial information including:
      a commercial severity rating, a proposed commercial severity rating, a commercial total mitigated event likelihood value, a proposed commercial total mitigated event likelihood value, a commercial mitigated event likelihood value, a proposed commercial mitigated event likelihood value, commercial risk score, a proposed commercial risk score, a commercial risk reduction factor, a proposed commercial risk reduction factor, and combinations thereof; and iv. combinations thereof;

o. computer instructions to form a scenario—consequence relationship table connecting the scenario identifier from the scenario library with the consequence identifier from the consequence library;

p. computer instructions to generate a cause library with a plurality of causes, each cause having a cause identifier, a cause name, a cause description, a cause type, a cause frequency, and a cause remark;

q. computer instructions to form a scenario—cause relationship table connecting the scenario identifier from the scenario library with the cause identifier from the cause library;

r. computer instructions to form a cause—consequence relationship table connecting the cause identifier from the cause library with the consequence identifier from the consequence library, and wherein each cause—consequence relationship has a cause—consequence identifier;

s. computer instructions to form a safeguards library with a plurality of safeguards, wherein each safeguard has: a safeguard name, a safeguard description, an independent protection layer basis, a safeguard identifier, an independent protection layer type, and a probably of failure on demand value;

t. computer instructions to form a cause—consequence—safeguards relationship table connecting the cause—consequence identifier from the cause—consequence relationship table and the safeguard identifier from the safeguard library;

u. computer instructions to form a computer generated risk assessment model for managing the process safety lifecycle for the safety instrumented system in the facility by:

i. obtaining the deviation name from the deviation library, ii. using the deviation name to obtain the node number from the scenario library connected to the PHA-Xref suffix;

iii. obtaining a scenario identified from the scenario library using the node number plus the PHA-Xref suffix;

iv. using the scenario identifier with the scenario—consequence relationship table, to obtain the consequence identifier;

v. using the consequence identifier to obtain safety information, environmental information and commercial information for the deviation;

vi. using the scenario—cause relationship table to obtain the cause identifier;
vii. using the cause identifier to obtain frequencies from the cause library for each scenario cause relationship record;
viii. using the consequence identifier and the cause identifier to obtain the cause—consequence identifier; and
ix. using the cause—consequence—safeguards relationship table to identify a safeguard identifier for each cause—consequence identifier;

v. computer instructions in the data storage to assign a tag name to at least one component identifier and to assign at least one voting instruction to at least one assembly identifier and at least one assembly group identifier, creating the computer generated safety instrumented system model with a functional specification and a physical specification for all of the instrumented protective function for the facility in real time;

w. computer instructions in the data storage to execute safety integrity level calculations using:
  i. a safety integrity level calculation engine;
  ii. each component of the facility with a tag name with voting instructions;
  iii. the functional specifications for each instrumented protective function;
  iv. the physical specifications for each instrumented protective function;
  v. user entered assumptions for each instrumented protective function; and
  vi. wherein the safety integrity level calculations identify and verify that the safety integrity level calculations are met simultaneously for each instrumented protective function using:
    1. an average probability of failure on demand for the instrumented protective function; and
    2. architectural constraint requirements for the instrumented protective function;

x. computer instructions for performing the layer of protection analysis to calculate a target probability of failure on demand for each instrumented protective function and compare it to the achieved probability of failure on demand from the computer generated safety instrumented system model using:
  i. using the safeguard identifier to obtain a safeguard independent protection layer IPL basis and the probability of failure on demand from the safeguard library;
  ii. calculating a mitigated event likelihood (MEL) for each cause—consequence identifier by multiplying the cause frequency by a probability of failure on demand for each safeguard identified in the cause—consequence—safeguard relationship table;
  iii. calculating a mitigated event likelihood (MEL) for each consequence identifier by summing the mitigated event likelihood (MEL) for each cause—consequence identifier where consequence identifier in the cause—consequence relationship table matches consequence identifier in the consequence library;
  iv. comparing the mitigated event likelihood (MEL) for each consequence identifier to a target event likelihood using the safety information, environmental information and commercial information identified with each consequence identifier to determine if the mitigated event likelihood is less than a target event likelihood;
  v. calculating a target probability of failure on demand (PFD) required to reduce a mitigated event likelihood (MEL) to a target event likelihood by dividing the target event likelihood by the mitigated event likelihood when mitigated event likelihood is greater than a target; and
  vi. comparing the target probability of failure on demand (PFD) from the safeguard library having an independent protection layer (IPL) type of an instrumented protective function to an achieved instrumented protective function probability of failure on demand from the instrumented protective function (IPF) library to identify gaps between the target probability of failure on demand (PFD) and achieved probably of failure on demand (PFD) from the computer generated safety instrumented system model;

y. computer instructions for performing safety integrity level selection for each instrumented protective function using the calculated target probability of failure on demand; and z. computer instructions for editing a component of a study, wherein the component of the study is a member of the group consisting of:
  i. a node from the node library;
  ii. a scenario from the scenario library;
  iii. a cause from the cause library;
  iv. a consequence from the consequence library;
  v. a safeguard from the safeguard library; and
  vi. a component from a relationship table.

2. The system of claim 1, further comprising computer instructions to create a study report.

3. The system of claim 2, further comprising computer instructions to edit the created study report.

4. The system of claim 1, wherein the computer generated safety instrumented system model comprises:
a. computer instructions to form a component library for the facility;
b. computer instructions to form an assembly library for the facility with each assembly having a test interval specification;
c. computer instructions to form the assembly—component relationship table, wherein the component library and the assembly library enable the assembly—component relationship table to depict a relationship between one of the assemblies and at least one component and to provide a purpose for each component in each assembly;
d. computer instructions to form an assembly group library for the facility in the data storage;
e. computer instructions to form an assembly group—assembly relationship table in the data storage, wherein the assembly group library and the assembly library enable the assembly group—assembly relationship table to depict a relationship between at least one assembly group and at least one assembly and to provide a parameter for each assembly;
f. computer instructions to form an instrumented protective function (IPF) library for the facility;
g. computer instructions to form an instrumented protective function (IPF)—assembly group relationship table, wherein the instrumented protective function library and the assembly groups library enable the instrumented protective function (IPF)—assembly group relationship table to depict a relationship between at least one instrumented protective function and at least one assembly group, forming a safety instrumented system with at least one instrumented protective function creating the computer generated safety instrumented system model of the instrumented protective function;

h. computer instructions for forming a logic solver as a component of the instrumented protective functions to execute voting instructions and to carry out functions of the instrumented protective functions and to carry out instructions to permit a user to edit or replace any logic solver; and i. computer instructions for forming a logic solver library for use with the logic solver.

5. The system of claim 4, wherein the data storage further comprises a documents library and wherein the documents library comprises a member of the group:
   a. a document identifier that provides a link to the document library;
   b. document types;
      i. cause and effect diagram documents;
      ii. safety requirements specification documents;
      iii. layer of protective analysis document types;
      iv. test plan procedures;
      v. safety integrity level calculation modeling files;
      vi. override risk assessments;
      vii. safety integrity level calculations; and
      viii. combinations thereof;
   c. document names; and
   d. document descriptions.

6. The system of claim 4, wherein the data storage further comprises a library of publications viewable for compliance, and wherein the library of publications comprises:
   a. statutes;
   b. industry standards;
   c. other national regulations;
   d. business owner specific policies; and
   e. combinations thereof.

7. The system of claim 4, wherein the component library comprises:
   a. a name representing an instance of equipment type;
   b. a process description;
   c. an equipment type;
   d. the component identifier for components in the assembly for identifying the component in the system;
   e. a component type describes a specific installation and operation at that specific installation;
   f. a tag name for identifying the instrument in a drawing;
   g. an asset identifier for identifying the instrument with a third party system to track the instrument location for maintenance, additional use, cost of ownership, and for use in inventory management; and
   h. a means for reconciling identifier for component lists with third party software related to the instrument; and
   i. combinations thereof.

8. The system of claim 4, wherein the assembly library comprises:
   a. a name of the assembly representing at least one component;
   b. a process description of the assembly;
   c. an assembly type that describes a specific installation and operation at that specific installation;
   d. a location of the assembly in a facility;
   e. the assembly identifier for the assembly for use in the library;
   f. an assembly probability of failure on demand as calculated by a safety integrity level calculation engine;
   g. an assembly based actuator to permit override of the safety integrity level calculation engine in the system and allow manual entry of a probability of failure for that assembly;
   h. the document identifier that provides a link to the document library; and
   i. an overt fault status that describes a state to transition an assembly to when an overt fault is recognized.

9. The system of claim 4, wherein the assembly—component relationship table comprises the assembly identifier, the component identifier, a purpose, and the logic solver.

10. The system of claim 4, wherein the logic solver library comprises:
    a. a logic solver identifier;
    b. a logic solver location;
    c. a name of a logic solver;
    d. a description of the logic solver;
    e. a probability of failure on demand for the logic solver; and
    f. a testing interval to define a required test.

11. The system of claim 4, wherein the assembly group library comprises:
    a. an assembly group identifier;
    b. a name of each assembly group;
    c. voting instructions for each assembly group;
    d. a user entered assumption for an assembly group;
    e. a calculated assembly group failure on demand;
    f. an assembly group type;
    g. the document identifier associated with assembly group; and
    h. combinations thereof.

12. The system of claim 4, wherein the formed instrumented protective function (IPF) library comprises:
    a. a protective layer identifier;
    b. an instrumented protective function name;
    c. an input group voting instruction;
    d. an output group voting instruction;
    e. a calculated instrumented protective function probability of failure on demand;
    f. a safeguard identifier from the safeguard library; and
    g. an instrumented protective function based actuator to permit override of the instrumented protective function safety integrity level calculation engine in the system and allow manual entry of a probability of failure for that instrumented protective function.

13. The system of claim 4, wherein the assembly group—assembly relationship table comprises:
    a. the assembly group identifier;
    b. the assembly identifier;
    c. an assembly parameter identifier;
    d. an assembly parameter value; and
    e. an assembly parameter unit.

14. The system of claim 4, wherein the instrumented protective function (IPF)—assembly group relationship table comprises:
    a. an instrumented protective function identifier;
    b. the assembly group identifier;
    c. an instrumented protective function (IPF)—assembly group relationship identifier; and
    d. an indication that an assembly group is functioning with additional action not included in the instrumented protection function safety integrity level calculation engine.

15. The system of claim 1, further comprising computer instructions to provide a location tree for each component in the computer generated safety instrumented system model, each instrumented protective function, each assembly, each assembly group and combinations thereof.

16. The system of claim 1, further comprising computer instructions to provide a page identifier in the computer generated safety instrumented system model, to display a module of the safety instrumented system model that the user is within at any time, which will provide a hierarchy of modules associated with the user location.

17. The system of claim 1, further comprising computer instructions that permit the user to edit or replace the component, the assembly, voting instructions for the assembly, the assembly group, the instrumented protective function, or combinations thereof.

18. The system of claim 1, further comprising computer instructions for creating a tag based model with tags and voting instructions.

19. The system of claim 1, further comprising computer instructions to use the formed relationship tables to form a cause and effect report for the user for each instrumented protective function.

20. The system of claim 1, further comprising computer instructions to generate functional test plans for a member of the group consisting of: an assembly, an assembly group, an instrumented protective function, and combinations thereof, using at least one of a plurality of test plan templates stored in the data storage.

21. The system of claim 1, further comprising computer instructions for instructing the processor to select a test plan template from the plurality of test plan templates using functional specifications, physical specifications and a member of the group consisting of: an assembly, an assembly group, an instrumented protective function, or combinations thereof.

22. The system of claim 21, wherein each test plan template comprises a plurality of tasks in support of process safety lifecycle management, and each task comprises at least one instructional step for test plan execution.

23. The system of claim 1, further comprising computer instructions for matching the asset identifier from the component library for a facility to components used in a facility asset management system, and to match components used in the facility maintenance management system, and combinations thereof; wherein the matching of components matches:
   a. failure rates in the safety integrity level calculations compared to actual failure rates recorded by the facility asset management system or a facility maintenance management system;
   b. test intervals in the safety integrity level calculations compared to actual test intervals recorded by the facility asset management system or the facility maintenance management system; or
   c. trip points of parameters for each assembly compared to trip points recorded by the facility asset management system or the maintenance management system.

24. The system of claim 23, further comprising computer instructions to use the relationship tables to match components from the component library for a facility to components in a facility historian using the asset identifier from the component library and recording the matched components, wherein the matching of components additionally validates a mean time to repair in the safety integrity level calculation as compared with actual unavailability time calculated by the facility historian.

25. The system of claim 1, further comprising computer instructions to update all information related to a component, an assembly, an assembly group, an instrumented protective function, or combinations thereof, simultaneously.

26. The system of claim 1, further comprising computer instructions to generate a safety requirements specification for the safety instrumented system and computer instructions allowing a user to edit the safety requirements specification for the safety instrumented system.

27. The system of claim 1, further comprising computer instructions to support management of change (MOC) for data records in the system by supporting "master" records, being untouched while "project" copies of the data records are edited and manipulated by users.

28. The system of claim 27, further comprising computer instructions to permit a user to check each edited record, mark each record as checked, approved, and then move the checked and approved record to "master" records by a qualified users.

29. The system of claim 1, further comprising computer instructions to connect data of the process hazard analysis and layers of protection analysis to the safety integrity level calculations.

30. The system of claim 1, further comprising computer instructions to support analysis of protection layers to be applied to reduce probability of a hazardous event occurring.

31. The system of claim 1, further comprising computer instructions to include analysis to calculate the safety integrity level calculations required to reduce risk to a target level.

32. The system of claim 1, further comprising in the client device computer instructions to connect data of the process hazard analysis and layers of protection analysis to the safety integrity level calculations, computer instructions to allow users of the client device to enter tolerable risk criteria for a facility to the system, and computer instructions to support revision tracking and impact reporting on proposed changes.

33. The system of claim 32, further comprising computer instructions to allow users to enter proposed changes and view impact reports prior to approving changes.

34. The system of claim 1, further comprising computer instructions to allow users to enter initiating causes captured in the facility that require the safety instrumented systems or other protection layers to respond.

35. The system of claim 1, further comprising computer instructions to allow users to manage imports of process hazard analysis and layers of protection analysis from other tools.

36. The system of claim 1, further comprising computer instructions to analyze the safety integrity level calculations and automatically identify optimum proof test intervals to meet the safety integrity level calculations.

37. The system of claim 1, further comprising computer instructions to allow users to enter a specific component for use in an instrumented protective function during design phase of a project.

38. The system of claim 37, further comprising computer instructions to allow users to search for the specific component by tag name to support process hazard analysis and layers of protection analysis activities.

39. The system of claim 37, further comprising computer instructions to create a report showing specific component information for like components used for risk reduction in the process hazard analysis and layers of protection analysis for the facility.

40. The system of claim 1, further comprising computer instructions to create a recommendations log from the risk assessment.

41. The system of claim 40, further comprising computer instructions to allow users to search the recommendations log based on: tag name, facility, module, area, safety instrumented functions name, or process hazard analysis node number.

42. The system of claim 1, further comprising computer instructions to allow calculations that allow users to compare at least two possible architectures for a safety instrumented function.

43. The system of claim 42, further comprising computer instructions that allow users to create copies of a first possible architecture and make modifications of the first possible architecture.

44. The system of claim 43, further comprising computer instructions that allow users to change which of the possible architectures is currently marked for use.

45. The system of claim 1, further comprising computer instructions to allow users to import data for an existing facility asset management system to populate a component library in the data storage.

46. The system of claim 1, further comprising computer instructions to create a report identifying deviations between the facility asset management system of the facility and the imported data in the data storage.

47. The system of claim 1, further comprising computer instructions to allow users to edit cause and effect documents, and allow the users to add cause and effect documents not used in the safety integrity level calculations.

48. The system of claim 1, further comprising computer instructions to allow users to create protections layers not used in layers of protection analysis or the safety integrity level calculations.

49. The system of claim 1, further comprising computer instructions to enter effects as additional actions.

50. The system of claim 1, further comprising computer instructions to allow users to view reports of project status.

51. The system of claim 1, further comprising computer instructions to generate facility acceptance tests using a software model of physical and functional specifications.

52. The system of claim 1, further comprising computer instructions to generate test plans for each safety instrumented function of the instrumented protective function.

53. The system of claim 1, further comprising computer instructions to generate a critical alarm list including risk ranking of hazards to which critical alarms apply.

54. The system of claim 53, further comprising computer instructions to generate a report of test performance for the critical alarms.

55. The system of claim 1, further comprising computer instructions to generate a report showing impact of bypassing on a risk gap being opened by placing equipment in bypass.

* * * * *

UNITED STATES PATENT AND TRADEMARK OFFICE
CERTIFICATE OF CORRECTION

| | | |
|---|---|---|
| PATENT NO. | : 8,639,646 B1 | Page 1 of 1 |
| APPLICATION NO. | : 13/966234 | |
| DATED | : January 28, 2014 | |
| INVENTOR(S) | : Carolyn Crosby Presgraves et al. | |

It is certified that error appears in the above-identified patent and that said Letters Patent is hereby corrected as shown below:

Title page, item (72) Inventor: should read as follows: Carolyn Crosby Presgraves, Anderson, --SC-- (US) and delete "TX".

Signed and Sealed this
Twenty-second Day of April, 2014

Michelle K. Lee
*Deputy Director of the United States Patent and Trademark Office*